United States Patent
Li et al.

(10) Patent No.: US 8,329,058 B2
(45) Date of Patent: *Dec. 11, 2012

(54) CHIRAL NEMATIC PHOTO DISPLAYS

(75) Inventors: Quan Li, Stow, OH (US); Lisa M. Green, Royal Oak, MI (US); J. William Doane, Kent, OH (US); Asad A. Khan, Kent, OH (US); Nithya Venkataraman, Wooster, OH (US); Irina Shiyanovskaya, Stow, OH (US)

(73) Assignees: Kent Displays Incorporated, Kent, OH (US); Kent State University, Kent, OH (US)

( * ) Notice: Subject to any disclaimer, the term of this patent is extended or adjusted under 35 U.S.C. 154(b) by 972 days.

This patent is subject to a terminal disclaimer.

(21) Appl. No.: 11/762,174

(22) Filed: Jun. 13, 2007

(65) Prior Publication Data

US 2007/0237906 A1  Oct. 11, 2007

Related U.S. Application Data

(63) Continuation-in-part of application No. 11/697,514, filed on Apr. 6, 2007, which is a continuation-in-part of application No. 11/006,100, filed on Dec. 7, 2004, now Pat. No. 7,236,151.

(60) Provisional application No. 60/565,586, filed on Apr. 27, 2004, provisional application No. 60/539,873, filed on Jan. 28, 2004.

(51) Int. Cl.
C09K 19/00 (2006.01)
C09K 19/52 (2006.01)
C09K 19/02 (2006.01)
C09K 19/06 (2006.01)
G02F 1/13 (2006.01)

(52) U.S. Cl. ............... 252/299.01; 252/299.6; 349/1; 349/19; 349/167; 349/168; 349/175; 349/176; 349/182; 349/186; 349/193; 428/1.1; 428/1.3

(58) Field of Classification Search ........... 349/1, 19, 349/167, 168, 175, 176, 182, 185–186, 193; 430/20; 252/299.01; 428/1.1, 1.3
See application file for complete search history.

(56) References Cited

U.S. PATENT DOCUMENTS

| | | |
|---|---|---|
| 3,600,060 A | 8/1971 | Churchill et al. |
| 3,680,950 A | 8/1972 | Haas et al. |
| 4,362,903 A | 12/1982 | Eichelberger et al. |
| 4,510,188 A | 4/1985 | Ruggeri |
| 4,566,935 A | 1/1986 | Hornbeck |
| 4,642,250 A | 2/1987 | Spector |
| 4,680,579 A | 7/1987 | Ott |
| 4,684,771 A | 8/1987 | Wuthrich |
| 4,688,900 A | 8/1987 | Doane et al. |
| 4,747,413 A | 5/1988 | Bloch |
| 4,890,902 A | 1/1990 | Doane et al. |
| 4,896,946 A | 1/1990 | Suzuki et al. |
| 4,948,232 A | 8/1990 | Lange |
| 5,007,872 A | 4/1991 | Tang |
| 5,061,553 A | 10/1991 | Olsen, Jr. |
| 5,155,607 A | 10/1992 | Inoue et al. |
| 5,161,479 A | 11/1992 | Mahr |
| 5,172,108 A | 12/1992 | Wakabayashi et al. |
| 5,200,845 A | 4/1993 | Crooker et al. |
| 5,360,503 A | 11/1994 | Coffy |
| 5,376,699 A | 12/1994 | Sage |
| 5,437,811 A | 8/1995 | Doane et al. |
| 5,453,863 A | 9/1995 | West et al. |
| 5,493,430 A | 2/1996 | Lu et al. |
| 5,530,457 A | 6/1996 | Helgeson |
| 5,625,477 A | 4/1997 | Wu et al. |
| 5,636,044 A | 6/1997 | Yuan et al. |
| 5,644,330 A | 7/1997 | Catchpole et al. |
| 5,668,614 A | 9/1997 | Chien et al. |
| 5,691,795 A | 11/1997 | Doane et al. |
| 5,734,155 A | 3/1998 | Rostoker |
| 5,748,277 A | 5/1998 | Huang et al. |
| 5,751,257 A | 5/1998 | Sutherland |
| 5,815,136 A | 9/1998 | Ikeda et al. |
| 5,847,798 A | 12/1998 | Yang et al. |
| 5,889,572 A | 3/1999 | Takahashi et al. |
| 5,981,408 A | 11/1999 | Nakagawa et al. |
| 5,996,897 A | 12/1999 | Prancz |
| 6,034,752 A | 3/2000 | Khan et al. |
| 6,061,107 A | 5/2000 | Yang et al. |
| 6,072,619 A | 6/2000 | Kiryuschev et al. |

(Continued)

FOREIGN PATENT DOCUMENTS

WO 9209065 5/1992

(Continued)

OTHER PUBLICATIONS

"Cholesteric liquid crystals for flexible displays," J. William Doane et al., Flexible Flat Panel Displays, Chapter 17, 2005, pp. 332-354.
"Reflective display with photoconductive layer and bistable reflective cholesteric mixture," Hidefumi Yoshida et al., Journal of the SID 5/3, 1997, pp. 269-274 and 318.
"Cholesteric liquid crystal micro-capsules with a perpendicular alignment shell for photo-addressable electronic paper," N. Hiji et al., SID 05 Digest, 2005, pp. 1560-1563.
"Photochemically induced reversible color changes in cholesteric liquid crystals," E. Sackman, Journal of the American Chemical Society, 93:25, Dec. 15, 1971, pp. 7088-7090.
"Photomodulation of liquid crystal orientations for photonic applications," Tomiki Ikeda, J. Mater. Chem., 2003, 13, pp. 2037-2057.
"A new axially chiral photochemical switch," Silvia Pieraccini et al., Chem. Commun., 2003, pp. 598-599.
"The control of the cholesteric pitch by some azo photochemical chiral switches," Silvia Pieraccini et al., Chem. Eur. J., 2004, 10, pp. 5632-5639.

(Continued)

Primary Examiner — Geraldina Visconti
(74) Attorney, Agent, or Firm — Pearne & Gordon LLP

(57) ABSTRACT

A photodisplay device in which an optically addressed image can be viewed indefinitely, erased and readdressed with a new image is disclosed. Optically responsive reversible photochiral materials are incorporated into a bistable cholesteric liquid crystal in an electrooptic display cell. A high resolution image exposed on the cell is fixed by a low voltage pulse to unpatterned electrodes and can be, at a later time, erased with a high voltage pulse.

42 Claims, 12 Drawing Sheets

U.S. PATENT DOCUMENTS

| | | | |
|---|---|---|---|
| 6,096,666 | A | 8/2000 | Jachimowicz et al. |
| 6,133,895 | A | 10/2000 | Huang |
| 6,154,190 | A | 11/2000 | Yang et al. |
| 6,224,964 | B1 | 5/2001 | Kawai et al. |
| 6,253,190 | B1 | 6/2001 | Sutherland |
| 6,268,839 | B1 | 7/2001 | Yang et al. |
| 6,268,841 | B1 | 7/2001 | Cairns et al. |
| 6,269,342 | B1 | 7/2001 | Brick et al. |
| 6,270,783 | B1 | 8/2001 | Slavtcheff et al. |
| 6,271,898 | B1 | 8/2001 | Clikeman et al. |
| 6,277,439 | B1 | 8/2001 | Painter |
| 6,278,429 | B1 | 8/2001 | Ruth et al. |
| 6,307,605 | B1 | 10/2001 | Bailey |
| 6,316,278 | B1 | 11/2001 | Jacobsen et al. |
| 6,320,563 | B1 | 11/2001 | Yang et al. |
| 6,359,673 | B1 | 3/2002 | Stephenson |
| 6,377,321 | B1 | 4/2002 | Khan et al. |
| 6,423,368 | B1 | 7/2002 | Stephenson et al. |
| 6,433,849 | B1 | 8/2002 | Lowe |
| 6,452,590 | B1 | 9/2002 | Awamoto et al. |
| 6,459,467 | B1 | 10/2002 | Hashimoto et al. |
| 6,468,638 | B2 | 10/2002 | Jacobsen et al. |
| 6,483,563 | B2 | 11/2002 | Khan et al. |
| 6,518,944 | B1 | 2/2003 | Doane et al. |
| 6,532,052 | B1 | 3/2003 | Khan et al. |
| 6,556,262 | B1 | 4/2003 | Stephenson et al. |
| 6,585,849 | B2 | 7/2003 | Smith et al. |
| 6,603,259 | B1 | 8/2003 | Kiryuschev et al. |
| 6,608,438 | B2 | 8/2003 | Topelberg et al. |
| 6,618,114 | B1 | 9/2003 | Freeman |
| 6,624,565 | B2 | 9/2003 | Topelberg |
| 6,628,256 | B2 | 9/2003 | Nishimura |
| 6,639,578 | B1 | 10/2003 | Comiskey et al. |
| 6,654,080 | B1 | 11/2003 | Khan et al. |
| 6,655,788 | B1 | 12/2003 | Freeman |
| 6,657,620 | B2 | 12/2003 | Oishi et al. |
| 6,697,191 | B2 | 2/2004 | Kiryuschev et al. |
| 6,710,760 | B1 | 3/2004 | Johnson et al. |
| 6,723,479 | B2 | 4/2004 | Van De Witte et al. |
| 6,727,197 | B1 | 4/2004 | Wilson et al. |
| 6,788,362 | B2 | 9/2004 | Stephenson et al. |
| 6,811,815 | B2 | 11/2004 | He et al. |
| 6,819,310 | B2 | 11/2004 | Huang et al. |
| 6,850,217 | B2 | 2/2005 | Huang et al. |
| 6,864,435 | B2 | 3/2005 | Hermanns et al. |
| 6,893,585 | B2 * | 5/2005 | Ichihashi ............. 252/299.01 |
| 6,902,454 | B1 | 6/2005 | Petruchik |
| 7,009,666 | B2 | 3/2006 | Khan et al. |
| 7,088,355 | B1 | 8/2006 | Ochi |
| 7,170,481 | B2 | 1/2007 | Doane et al. |
| 7,236,151 | B2 | 6/2007 | Doane et al. |
| 2001/0015712 | A1 | 8/2001 | Hashimoto |
| 2002/0030776 | A1 | 3/2002 | Khan et al. |
| 2002/0030786 | A1 | 3/2002 | Stephenson |
| 2002/0186182 | A1 | 12/2002 | Stephenson et al. |
| 2003/0011549 | A1 | 1/2003 | Murahashi et al. |
| 2003/0016329 | A1 | 1/2003 | Smith et al. |
| 2003/0019575 | A1 | 1/2003 | Smith et al. |
| 2003/0031845 | A1 | 2/2003 | Umeya et al. |
| 2003/0034945 | A1 | 2/2003 | Mi et al. |
| 2003/0063245 | A1 | 4/2003 | Bowley et al. |
| 2003/0071791 | A1 | 4/2003 | Hanson et al. |
| 2003/0085380 | A1 | 5/2003 | Schuhmacher et al. |
| 2003/0117548 | A1 | 6/2003 | Stephenson |
| 2003/0155151 | A1 | 8/2003 | Hermanns et al. |
| 2003/0160912 | A1 | 8/2003 | Stephenson |
| 2003/0169221 | A1 | 9/2003 | Stephenson et al. |
| 2003/0184569 | A1 | 10/2003 | Koga et al. |
| 2003/0202136 | A1 | 10/2003 | Stephenson et al. |
| 2003/0206147 | A1 | 11/2003 | Mi et al. |
| 2003/0206260 | A1 | 11/2003 | Kobayashi et al. |
| 2003/0222139 | A1 | 12/2003 | Stephenson et al. |
| 2004/0032545 | A1 | 2/2004 | Stephenson et al. |
| 2004/0080477 | A1 | 4/2004 | Capurso et al. |
| 2005/0001797 | A1 | 1/2005 | Miller, IV et al. |
| 2005/0003144 | A1 | 1/2005 | Buttgen et al. |
| 2005/0007336 | A1 | 1/2005 | Albert et al. |
| 2005/0079386 | A1 | 4/2005 | Brown, Jr. et al. |
| 2005/0083284 | A1 | 4/2005 | Huang et al. |
| 2005/0162606 | A1 | 7/2005 | Doane et al. |
| 2005/0179678 | A1 | 8/2005 | Nose et al. |
| 2005/0195354 | A1 | 9/2005 | Doane et al. |
| 2006/0124899 | A1 | 6/2006 | Welter |
| 2006/0204675 | A1 | 9/2006 | Gao et al. |
| 2007/0059901 | A1 | 3/2007 | Majumdar et al. |
| 2007/0285385 | A1 | 12/2007 | Albert et al. |
| 2008/0309598 | A1 * | 12/2008 | Doane et al. ............. 345/87 |

FOREIGN PATENT DOCUMENTS

| | | |
|---|---|---|
| WO | 9211311 | 7/1992 |
| WO | 2004/029708 | 4/2004 |
| WO | 2005/072447 | 8/2005 |
| WO | 2005/072455 | 8/2005 |
| WO | 2005/081779 | 9/2005 |

OTHER PUBLICATIONS

"Sterically overcrowded alkenes; a stereospecific photochemical and thermal isomerization of a benzoannulated bithioxanthylidene," Ben L. Feringa et al., J. Chem. Soc. Chem. Commun., 1993, pp. 288-290.

"Chiroptical molecular switches," Ben L. Feringa et al., Chem. Rev., 2000, 100, pp. 1789-1816.

"Modification of the twist angle in chiral nematic polymer films by photoisomerization of the chiral dopant," Pete van de Witte et al., Journal of Applied Physics, vol. 85, No. 11., Jun. 1, 1999, pp. 7517-7521.

"Light-induced color change of cholesteric copolymers," Martin Brehmer et al., Adv. Mater. 1998, 10, No. 17, pp. 1438-1441.

"Photostable tilted-perpendicular alignment of liquid crystals for light valves," Anna Lackner et al., Proceedings of the SID, vol. 31/4, 1990, pp. 321-326.

"Transparent phase images in photoactivated liquid crystals," J.S. Margerum et al., Applied Physics Letter, vol. 19, No. 7, Oct. 1, 1971, pp. 216-218.

"Development of a flexible electronic display using photographic technology," Stanley Stephenson et al., SID 04 Digest, pp. 774-777.

"A fully flexible colour display," Peter Slikkerveer et al., SID 04 Digest, pp. 770-773.

"Robust flexible LCD's with paintable technology," Joost P.A. Volgels et al., SID 04 Digest, pp. 767-769.

"Invited paper: What is electronic paper? The expectations," Makoto Omodani, SID 04 Digest, pp. 128-131.

"Effect of woven fabric anisotropy on drape behavior," Sidabraite et al., ISSN 1392-1320, Materials Science, vol. 9, No. 1, 2003, pp. 111-115.

"The characterisation of the static and dynamic drape of fabrics," G.K. Stylios et al., J. Text. Inst., 1997, 88 Part 1, No. 4, pp. 465-475.

"Modelling the fused panel for a numerical stimulation of drape," Jevsnik et al., Fibers & Textiles in Eastern Europe, Jan./Mar. 2004, vol. 12, No. 1, pp. 0047-0052.

"Mechanics of elastic performance of textile materials," Chauncey Chu et al., Textile Research Journal, Aug. 1950, pp. 539-548.

"The dependence of fabric drape on bending and shear stiffness," G.E. Cusick, J. Textile Institute, 36, 11, 1965, pp. T597-T607.

"Liquid crystal dispersions," Paul S. Drzaic., World Scientific, Series on Liquid Crystals, vol. 1, pp. xi-xv, 1995.

"Plastic VGA reflective cholesteric LCDs with dynamic drive," G.M. Podojil et al., SID proceedings, 1998, pp. 51-54.

"Reflective color display using cholesteric liquid crystals," K. Hashimoto et al., SIC 98 Digest, pp. 897-900.

"Robust flexible LCDs with paintable technology," J.P.A. Vogels et al., Society for Information Display, 2004, Proceedings, pp. 767-769.

"Black and white photo-addressable electronic paper using encapsulated cholesteric liquid crystal and organic photoconductor," T. Kakinuma et al., IDW 2002, pp. 1345-1348.

"Characterization of "Peas in a Pod", a novel idea for electronic paper," S. Maeda et al., IDW 2002, pp. 1353-1356.

"Holographic polymer-dispersed liquid crystals (H-PDLCs)," T.J. Bunning et al., Annu. Rev. Mater. Sci. 2000, 30:83-115, pp. 83-115.

"Reflective display with photoconductive layer and bistable reflective cholesteric mixture," H. Yoshida, Journal of SID 5/3 1997, pp. 269-274.

"Reflective multicolor display using cholesteric liquid crystals," M. Okada et al., Proc. SID 97 Digest, pp. 1019-1022.
"Multiple color high resolution reflective cholesteric liquid crystal display," D. Davis et al., Proc IDRC (242) 1997.
"Full color (4096 colors) reflective cholesteric liquid crystal display," X. Huang et al., Proceedings of Asia Display, 98, pp. 883-886 (1998).
"Liquid crystals: applications and uses," J. W. Doane, World Scientific Publishers, Ch. 14 (1990).
"A 30-V row/column driver for PSCT LCD using high-voltage BiMOS process," Jing-Jou Tang et al., Online Article, dated 1999.
http://www/us.semiconductors.phillips.com/pip/PCF8578.html, LCD/row/column driver for dot matrix graphic displays, printed Jul. 8, 2003, pp. 1-3.
"40CH segment/driver for dot matrix LCD," KS0065B, Samsung Electronics, 12 pages.
"Cholesteric liquid crystal for flexible displays," J.W. Doane et al., Flexible Flat Panel Displays, Chapter 17 (2005), pp. 331-354.
"Polymer dispersed liquid crystal displays," J.W. Doane, Liquid Crystals: Applications and Uses, World Scientific Pub. (1990), Chapter 14, pp. 361-395.
"Active matrix LC displays," F.C. Luo, Liquid Crystals: Applications and Uses, Chapter 15, pp. 397-436.
"Reflective display with photoconductive layer and a bistable reflective cholesteric mixture," Hidefumi Yoshida et al., Journal SID 5/3, 1997, pp. 269-274.

R.D. Sterling et al., "Video-Rate Liquid Crystal Light Valve using Amorphous Silicon Photoconductor" proceedings of the SID, XXI, 327-329 (1990).
Li et al., J. Am. Chem. Soc., 9 vol. 129, pp. 12908-12909 (2007).
A. Bobrovsky et al., Polymers for Advanced Technologies, vol. 13, pp. 595-600 (2002).
J.W. Doane et al., Proceedings of Japan Display '92 (Hiroshima), pp. 73-76 (1992).
Fundamentals of Liquid Crystal Devices, D-K Yang and S.T. Wu, Chapter 1 (John Wiley & Sons, New York 2006).
Office Action dated Mar. 8, 2006 for U.S. Appl. No. 11/046,487, filed Jan. 28, 2005, which is now Patent No. 7,170,481.
Notice of Allowance dated Aug. 28, 2006 for U.S. Appl. No. 11/046,487, filed Jan. 28, 2005, which is now Patent No. 7,170,481.
Office Action dated Mar. 8, 2006 for U.S. Appl. No. 11/006,100, filed Dec. 7, 2004, which is now Patent No. 7,236,151.
Notice of Allowance dated Dec. 28, 2006 for U.S. Appl. No. 11/006,100, filed Dec. 7, 2004, which is now Patent No. 7,236,151.
"LCD components obtained by patterning of chiral nematic polymer layers," Peter van de Witte et al., J. Mater. Chem., 1999, 9, pp. 2087-2094.

* cited by examiner

CHIRAL NEMATIC PHOTO DISPLAYS

CROSS-REFERENCE TO RELATED APPLICATIONS

This is a continuation-in-part of U.S. patent application Ser. No. 11/697,514 filed Apr. 6, 2007, which is a continuation-in-part of U.S. patent application Ser. No. 11/006,100 filed Dec. 7, 2004, which claims the benefit of U.S. Provisional Patent Application No. 60/565,586 filed Apr. 27, 2004 and U.S. Provisional Patent Application No. 60/539,873 filed Jan. 28, 2004, all of which are incorporated herein by reference in their entireties.

BACKGROUND OF THE INVENTION

A revolution in the information display technology began in the early 1970s with the invention of the liquid crystal display (LCD). Because the LCD is a flat-panel display of light weight and low power which provides a visual read out that conforms to the small size, weight and battery demands of a handheld electronic device, this display technology enabled a new broad class of handheld and other portable products. Commercially, the LCD first appeared in volume as a digital readout on wrist watches, then on instruments and later, enabled the laptop computer, personal data assistant and many other digital devices. Today LCD technology is even replacing cathode ray tubes in televisions and PCs.

LCDs that appear on TVs, PCs, handheld devices, etc. are electronically addressed with an image by a multitude of direct electrical connections (interconnects) between the integrated driving circuits (drive chips) and the display electrodes that make up the pixel elements. The electrodes may be the rows and columns of a passive matrix or the data and control lines of an active matrix. The electrodes are connected by interconnects to drive chips which are further connected to and operated by controller circuitry. The drive chips and control circuitry make up a substantial cost of the display and interconnects to the drive chips must be manufactured with high yield so that there are no unaddressed pixels in the display image. It is largely because of these problems that LCDs have not been popular for such applications as point of sales signs in supermarkets, body worn displays such as badges and other applications where either the complexity of wiring up a collection of displays or the cost, weight and bulkiness of the electronics prevents their use.

Reflective bistable cholesteric displays were invented in 1991 whereby an image could be written on the display and the image retained indefinitely without any applied power [see: J. W. Doane and A. Khan "Cholesteric Liquid Crystals for Flexible Displays" in *Flexible Flat-Panel Displays*, Edited by G. Crawford, Chapter 17 (John Wiley & Sons, 2005)]. In this case, the drive electronics could be removed entirely from the display and a bright, high contrast image could be viewed at wide angles; this would be very effective for such applications as point of sales or body worn displays. However, the drive electronics would need to be reconnected to change the image thus preventing cholesteric displays from being an attractive solution for these applications.

In 1997, H. Yoshida et al. at the Liquid Crystal Institute at Kent State University offered a clever solution to this problem [see: Yoshida et al., "Reflective Display with a Photoconductive Layer and Bistable Reflective Cholesteric Mixture" *Journal of the SID*, 5/2, 269-274 (1997)]. Borrowing from earlier work on photo activated systems, they incorporated a photoconductive layer between one of the electrodes and the cholesteric liquid crystal layer to create a photoactivated reflective bistable cholesteric display [see: A. M. Lackner, et al., "Photostable Tilted-Perpendicular Alignment of Liquid Crystals for Light Values" *Proceedings of the SID*, 31/4, 321-325 (1990)]. This concept enabled a display that could be addressed with a high resolution image without any drive chips or control circuitry and with only two electrical interconnects to apply a voltage to simple unpatterned electrodes. This not only eliminated bulky and costly electronics from the display but also avoided the necessity of making electrical connections to a multitude of electrodes. Recently, photoactivated bistable cholesteric displays have been further developed by Fujitsu workers [see: WO 04/029,708 A1] for contrast improvement. Workers at Fuji Xerox Ltd. also extended the photo activation concepts to flexible displays by employing organic photoconductors on the display substrate [see: N. Hiji et al., SID Digest of Papers, Vol. XXXIV, 1560-1563, (2005)]. Fuji Xerox has further developed products from these devices.

Other types of photoactivated cholesteric or chiral nematic display devices have been devised that employ photo sensitive chemical additives that adjust the reflective wavelength of the chiral nematic material in the display. In such a device the photosensitive additive shifts the reflective wavelength of exposed region of the planar texture to create an image avoiding the use of a photoconductive layer.

The idea of a chiral photochemical reaction to change the twist and hence the pitch length of a chiral nematic material goes back as far as 1971 and the studies of Sackman [E. Sackman, *J. Chem. Phys. Soc.*, 93, 7088 (1971)]. Since that time there have been some remarkable advancements in the development of novel chiral materials, [see T. Ikeda, *J. Mater. Chem.*, 13, 2037-2057 (2003)]. Of particular interest are photochemical switches that act both as a chiral agent to induce a cholesteric phase in a nematic liquid crystal and a photoresponsive dopant that can have a pronounced effect on the twist of the cholesteric helix. Many of the studies have involved the photo-responsive azobenzenes with chiral pendants attached to various positions; however the values of the helical twisting powers are low. Recently Pieraccini et al., [S. Pieraccini et al., *Chem. Comm.*, 598-599 (2003); S. Pieraccini et al., *Chem Eur. J.*, 10, 5632-5639 (2004)] synthesized several bis(azo) compounds containing axially chiral binaphthyls which were found to exhibit large twisting powers. One isomer was measured to yield a twisting power of 144 $\mu m^{-1}$ and upon irradiating the material alternately at ultraviolet and visible wavelength the twisting power could be switched repeatedly between 75 $\mu m^{-1}$ and 105 $\mu m^{-1}$. As will be described below, this is an encouraging result for the application proposed here and, advantageously, could be used to switch the reflective wavelength by 30%. Other photoswitching compounds have been examined by Feringa et al. [B. L. Feringa et al., *J. Chem. Soc. Chem. Comm.*, 288, (1993)] who studied the sterically overcrowded alkenes as chiroptical trigger molecules. Upon irradiation at the appropriate wavelength, these molecules undergo cis-trans photoisomerizations that simultaneously result in helix reversal. Other photochemicals include the diarylethenes known for high thermal stability of both isomers and high fatigue resistance (high durability) and others that can be found in excellent reviews on the subject [see B. L. Feringa et al., *Chemical Reviews*, 100, 1789-1816 (2000)].

More recently, T. E. Welter et al. (U.S. Patent Application Publication 2006/0124899) have disclosed a series on photochemically active chiral compounds for use in shifting the Bragg reflective peak in the planar texture of a chiral nematic material.

Photochemical materials have been incorporated into polymers and used for making irreversible images on polymer films [see M. Brehmer et al., *Advanced Materials*, 10, 1438-1441 (1998) and P. van de Witte et al. *Journal of Applied Physics*, 85, 7517-7521 (1999). In this application, films are formed from the materials which can then be irradiated through a mask to create an image replicating the mask on the film. The use of polymeric materials reduces molecular diffusion allowing the image to be retained on the film for an extended period of time. U.S. Pat. No. 6,723,479 B2 describes means for transferring optically modified films to surfaces of various items.

In the invention reported here the photochemical materials are prepared and used to create reversible images. The images can remain on the display indefinitely without degradation and can be erased and rewritten. New reversible photo responsive chiral materials are disclosed with high twisting power and high sensitivity to ultraviolet of addressing an image on the display. The invention discloses a photosensitive device that can display a high resolution image without the need of attached drive and control electronics substantially reducing the cost of the display unit for use in applications where paper is currently used.

DISCLOSURE OF THE INVENTION

We disclose a photoaddressed cholesteric reflective display in which the image is created on the display by impinging ultraviolet or visible light or other electromagnetic radiation, which locally shifts the reflective wavelength of the cholesteric material. Materials for these cholesteric displays are made by mixing a chiral compound with nematic liquid crystal. The chiral additive twists the nematic material into a helical arrangement with a periodicity of the wavelength of light. Because of the dielectric anisotropy of the nematic liquid crystal, the result is a self-formed dielectric stack which will Bragg reflect light. According to Bragg's law, the wavelength $\lambda$, of the selective reflection is given by the equation: $\lambda = np$ where p is the pitch length of the helical structure and n is the average refractive index of the liquid crystal mixture. In mixtures of a nematic liquid crystal with one chiral additive, the reciprocal of the pitch length is approximately proportional to the concentration $\chi$, of the chiral compound, $p^{-1} = \beta \chi$ with $\beta$ being the helical twisting power (HTP). Chiral additives available today have twisting powers typically of $\beta < 5$ $\mu m^{-1}$ when $\chi$ is measured in weight percent but can vary widely to be greater than 200 $\mu m^{-1}$ or less than 1.0 $\mu m^{-1}$ depending upon the chiral compound and the host cholesteric material.

This invention makes use of multiple chiral additives of twisting powers, $\beta_1, \beta_2, \beta_3, \ldots \beta_n$ whereby the inverse pitch length depends additively on these materials and their respective concentrations according to the equation: $p^{-1} = \beta_1 \xi_1 + \beta_2 \xi_2 + \ldots + \beta_n \xi_n$. At least one of the chiral additives in the invention is made of a compound in which the molecular structure is a conformer whereby the conformation of the molecule is altered with impinging light. This photochemical chiral molecule with a helical twisting power of $\beta_c$, undergoes a light induced isomerization into another conformer or isomer which has different helical twisting power. When irradiated with light or other electromagnetic radiation of a specific wavelength the chiral will switch from one isomer to the other changing the value of its twisting power. That is to say, the twisting power of the chiral compound is modulated by impinging light. One of the conformations may be metastable at a particular temperature while the other is stable or they both can be stable. In some cases there may be more than two isomers. According to one aspect of this invention, the reversible photo responsive chiral compound is dissolved in the nematic liquid crystal host as the sole chiral additive. In another aspect of the invention the conformer chiral compound is dissolved in the nematic liquid crystal host in addition to other chiral additives.

When a photosensitive chiral material of twisting power $\beta_c$ is added to a normal chiral material of twisting power $\beta_n$, the inverse pitch becomes $p^{-1} = \beta_n \xi_n + \beta_c \xi_c$ where $\xi_n$ and $\xi_c$ are the concentrations of the normal chiral and conformer chiral respectively. The reflective wavelength only has to change a small amount to observe a high contrast image. The magnitude of the change is calculated by the differential equation $d(p^{-1}) = d(\beta_n \xi_n + \beta_c \xi_c) = \xi c (d\beta_c)$ since the only variable in the equation is $\beta_c$. Since $d(p^{-1}) = -dp/p^2$ the change in wavelength is approximated by the equation $\Delta\lambda = n\Delta p = np^2 \xi_c (\Delta\beta_c)$ where $\Delta\beta_c$ is the change in the twisting power of the conformer chiral. The percent change $(100) \Delta\lambda/\lambda = p\xi_c(\Delta\beta_c)100 = \xi_c(\Delta\beta_c) 100/(\beta_n \xi_n + \beta_c \xi_c)$. If the photosensitive chiral compound is the only chiral additive then the percent change of the wavelength is: $100(\Delta\beta_c)/\beta_c$. By designing photosensitive chiral compounds that provide large values of $\Delta\beta_c$, one can control the sensitivity of the material to the intensity of the addressing light source.

The light-induced configuration isomerization of the compounds disclosed here is shown in Scheme 1 below. Due to the molecules having two azo linkages, ultraviolet irradiation leads to revisable trans-cis isomerization of azo configurations producing two other isomers containing one or two cis configurations, respectively (Scheme 1). The sequence of photochemical switches of the three isomers is trans-trans→trans-cis→cis-cis. The reverse process from cis-cis→trans-cis→trans-trans can occur thermally or photochemically with visible light.

Scheme 1:

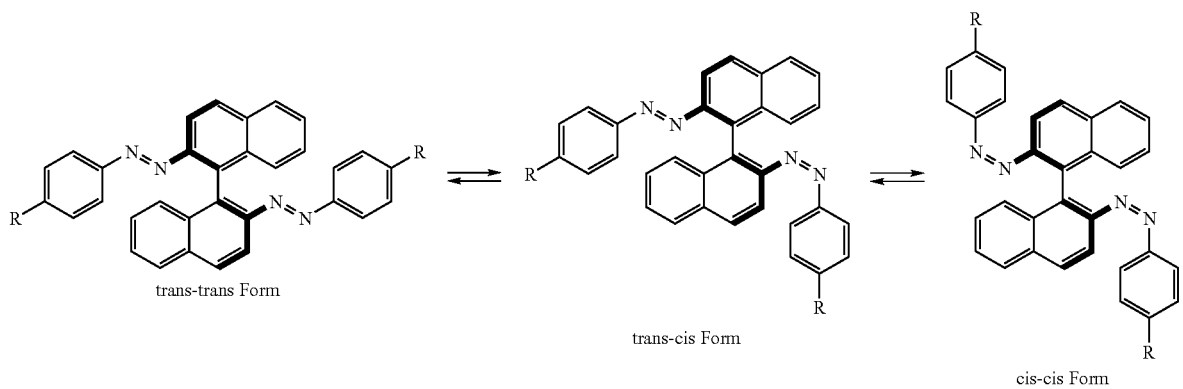

trans-trans Form trans-cis Form cis-cis Form

When dissolved into either a nematic liquid crystal host or a cholesteric liquid crystal host, each of the isomers exhibits a different twisting power and hence creates a helical structure with a different pitch length. In actual practice, all isomers may be present at any given time but in different concentrations depending upon the intensity, wavelength and time period of irradiation as well as the temperature of the material and the time following the irradiation. In this case, the photosensitive chiral compound exhibits an average twisting power depending upon the relative concentration of the isomers. The reflective wavelength of the chiral material is therefore changed by incident electromagnetic radiation on the material.

In one embodiment of the photodisplay the chiral nematic material is coated or otherwise disposed on a substrate with black or colored background to achieve high contrast. For example, if the concentrations of the chiral additives are adjusted so that the pitch length of the material reflects in the yellow, then a display cell with the chiral nematic with black background will show an iridescent yellow color when in its planar texture. If, however, the background of the display cell is blue, the display cell will appear white since the blue color of the background will additively mix with the yellow reflective color to produce white. By selecting a chiral conformer that shifts the wavelength of the chiral additives to some other color, say blue, then the cell with the black background will show a blue color at locations that are irradiated and yellow where not irradiated displaying an image in the planar texture we refer to as a planar image. When irradiated through a mask of a selected image, that image will appear as a blue planar image on yellow background on the display. In the case of the display cell with a blue background, irradiation through the mask will show a blue planar image on a white background. If, on the other hand the pitch of the base material is in the infrared and the background is black, the display will show a color planar image on black with the color depending upon the pitch of the chiral in its other photo induced conformation. Such a display is limited because the planar image will self erase over a period of time as a result of two effects: self diffusion of the chiral additive and thermal relaxation.

Thermal relaxation can erase the planar image over a period of hours or less because the various photoinduced isomers may be thermally unstable relaxing to the preferred trans-trans configuration as illustrated in scheme 1 above.

Self-diffusion of the photoaddressed chiral additive will degrade a planar image of this embodiment of a photo addressed display unless the chiral additive is confined so that it cannot diffuse far. This problem is solved by using droplet dispersions of the chiral nematic materials in which the material is encapsulated in droplets approximately 50-100 μm in size, for example, small enough for an extremely high resolution display suitable for photographs. There are various processes for preparing droplet dispersions, for example, microencapsulation, emulsions and phase separation. Thin display films are fabricated by coating a droplet dispersion on a substrate [U.S. patent applications Ser. Nos. 11/046,487 and 11/006,100 and PCT patent application No.: PCT/US2005/003144], which are incorporated herein by reference.

A second embodiment of this invention is a photocell display device that incorporates transparent conducting electrodes above and below the photo chiral doped chiral nematic material. The photo display design is similar to a normal bistable electronically switched display; however, the electrodes do not have to be patterned and electronic drive and controller circuitry is not present. The purpose of the electrodes in this embodiment is to electrically switch the cholesteric material into the planar or focal conic or homeotropic texture as desired. Being able to change textures provides several added advantages:

The image may be maintained indefinitely without thermal degradation;
A photoaddressed image may be viewed in ambient light without degradation;
The image will not be erased by self diffusion and encapsulation is not required;
The image may be erased and rewritten; and
An image may be hidden from view then be made to later reappear.

In many respects the photodisplay is similar to a photographic camera but with a major difference; the photo image may be erased from the film and a new image addressed. The photodisplay works on the unique voltage thresholds of a bistable chiral nematic display. The threshold values depend on the pitch length of the chiral nematic material. When a region of the display is exposed to ultraviolet light the threshold will change while the threshold of the unexposed region is unchanged. By applying a voltage pulse of suitable magnitude to the electrodes the exposed region will be switched to the transparent focal conic texture. On a photodisplay cell with a black absorbing back layer the focal conic state will appear black in contrast to the unexposed color reflective planar texture. In a bistable chiral nematic display both the focal conic and the planar texture are stable so that the image will not degrade with time but is fixed until electronically erased and is referred to as a fixed image to distinguish it from the planar image that will degrade with time. With suitable filters on the display device the photoaddressed fixed image can be viewed in ambient light indefinitely until erased and a new fixed image addressed. A fixed image can be erased with voltage of higher magnitude by clearing the display cell to the all-planar texture after the planar image has been thermally erased. The photodisplay device can be of two types depending upon the reversibly photoswitchable chiral dopant and the chiral mixtures. One type will display a fixed positive image and the other a fixed negative image.

Other advantages in this inventive photodisplay design became apparent. For example, one can hide an image that is in the planar from being viewed on the display by switching the entire display to the focal conic texture. The photodisplay can therefore act as a memory device even when the image cannot be seen. The homeotropic state also can be used to hide the image. In this case continual power need be applied to hold the chiral nematic material in the untwisted homeotropic state.

There is a need in today's marketplace for a very low-cost display (on the order of pennies) that can display a high resolution image without applied power. The photodisplay is updated with an image writing device that can be an emissive display such as an LED, OLED or backlit LCD. The updating device projects an image to photo address the display. The image may be formed from a digital image Photo addressed displays that can use optical updating include name tags and badges, electronic shelf labels, debit or credit cards as well as informational signs. Shelf labels could include a bar code scanner to read a bar code and automatically update a display if the price has been changed once the updating device reads the bar code and determines that a price change is warranted. As cost is an overriding factor in these applications, the display must be exceedingly simple, contain few parts and be manufacturable in high volume. The optical addressed display of this invention requires no electrode patterning, no drive and no control circuitry and is simple. The device invented here can be manufactured on simple web coating or print equipment. With optical addressing, extremely high resolution images are possible.

OBJECTS OF THE INVENTION INCLUDE

To provide a photodisplay device that can be optically addressed with an image that may be displayed in visible light without distortion or degradation over extended periods of time;

To provide a photodisplay in which the image can be repeatedly electrically erased and another image optically addressed to the display;

To provide a photodisplay that can display a high resolution image without patterned electrodes and avoiding complex electronic drive and control circuitry that add to the cost of the display;

To provide a display of low cost that can be used as a replacement of displays of printed ink on paper;

To provide low-cost displays for point of sales signs, shelf labels, debit or credit cards, name plates, name tags or office information signs;

To provide a photoactivated display employing photo sensitive chiral additives as dopants to nematic or chiral nematic liquid crystalline material that adjust the reflective wavelength of the chiral material in the display when in the planar texture;

To provide a photodisplay device that can be optically addressed with a positive image that may be displayed in visible light without distortion or degradation over extended periods of time;

To provide a photodisplay device that can be optically addressed with a negative image that may be displayed in visible light without distortion or degradation over extended periods of time;

To provide a photodisplay device in which image in the planar texture can be hidden from view by electronically switching the material to the focal conic texture then be made to reappear by switching back into the planar texture;

To provide a photodisplay device in which image in the planar texture can be hidden from view by electronically switching the material to the untwisted homeotropic texture then be made to reappear by switching back into the planar texture;

To provide reversible photo responsive chiral binaphthyl compounds suitable for nematic and chiral nematic additives suitable to alter the Bragg reflective wavelength when used as additives;

To provide reversible photo responsive chiral binaphthyl compounds to be used in photodisplays for displaying images in the planar texture;

To provide reversible photo responsive chiral binaphthyl compounds to be used in photodisplays for displaying positive or negative images using the focal conic texture;

To provide reversible photo responsive chiral binaphthyl compounds for photodisplays in which an optically addressed image can be repeatedly erased and readdressed with a new image; and To provide reversible photo responsive chiral binaphthyl compounds to be used in photodisplays in which images in the planar texture can be electrically hidden and made to reappear at a later time.

More specifically, a first embodiment of the invention features a chiral nematic liquid crystal photodisplay comprising:

a liquid crystal layer including cholesteric liquid crystal material, the liquid crystal material comprising nematic liquid crystal and at least one photosensitive chiral additive, wherein the photosensitive chiral additive is adapted to change a reflective wavelength of the liquid crystal layer at exposed regions at which addressing electromagnetic radiation is incident on the liquid crystal layer thereby producing a planar image in a planar texture of the liquid crystal layer;

electrically conductive layers flanking the liquid crystal layer; and electrical addressing means for applying an electric field to the liquid crystal layer between the conductive layers, wherein the electrical addressing means applies the electric field at a magnitude that switches the exposed regions to a focal conic texture producing a fixed negative image.

A second embodiment of the present invention features a chiral nematic liquid crystal photodisplay comprising:

a liquid crystal layer including cholesteric liquid crystal material, the liquid crystal material comprising nematic liquid crystal and at least one photosensitive chiral additive, wherein the photosensitive chiral additive is adapted to change a reflective wavelength of the liquid crystal layer at exposed regions at which addressing electromagnetic radiation is incident on the liquid crystal layer thereby producing a planar image in a planar texture of the liquid crystal layer;

electrically conductive layers flanking the liquid crystal layer; and electrical addressing means for applying an electric field to the liquid crystal layer between the conductive layers, wherein the electrical addressing means applies the electric field at a magnitude that switches unexposed regions, which are not exposed to the addressing radiation, to a focal conic texture producing a fixed positive image.

The following refers to more specific features applicable to both the first and second embodiments unless otherwise indicated. The electrical addressing means can apply a voltage pulse to the conductive layers of a magnitude that switches the exposed regions to the focal conic texture producing the fixed negative image. The electrical addressing means can apply a voltage pulse to the conductive layers of a magnitude that switches the unexposed regions to the focal conic texture producing the fixed positive image. Both the fixed negative image and the fixed positive image can be displayed indefinitely without thermal degradation. The planar image can be erased from the planar texture by thermal relaxation of the exposed photosensitive chiral additive.

The electrical addressing means can apply a voltage pulse to the conductive layers that returns the fixed negative image to the planar image. The voltage pulse is of sufficient magnitude to drive all of the chiral nematic material of the display to a homeotropic state during application of the pulse and into the planar texture following the pulse. The planar image can be erased from the planar texture by exposure of visible light to the photosensitive chiral additive.

The electrical addressing means can apply a voltage pulse to the conductive layers that returns the fixed positive image to the planar image. The voltage pulse is of sufficient magnitude to drive all of the chiral nematic material of the display to a homeotropic state during application of the pulse and into the planar texture following the pulse. The planar image can be erased from the planar texture by exposure of visible light to the photosensitive chiral additive.

Other features applicable to the first and second embodiments are as follows. The addressing radiation can be ultraviolet light. The electric field can be applied in the form of a voltage pulse of a magnitude that places all of the liquid crystal material of the display in one of the focal conic texture or a homeotropic state resulting in the planar image not being displayed; and the electric field can be applied in the form of a voltage pulse of a magnitude that places all of the liquid crystal material of the display in the planar texture resulting in the planar image being displayed. The photodisplay can include a substrate, one of the conductive layers being disposed between the substrate and the liquid crystal layer. The substrate can be flexible and selected from the group consisting of a polymer, fabric, electrotextile, a metal foil, a flexible printed circuit board, a flexible graphite foil sheet, a flexible composite or nanocomposite film, a flexible opto-electronic device, a flexible glass sheet, a nanofiber fabric and combinations thereof. The photodisplay can comprise a second substrate that is flexible, another of the conductive layers being disposed between the second substrate and the liquid crystal layer. A device can include the photodisplay, wherein the device is selected from the group consisting of: point of sales signs, debit cards, credit cards, name plates, name tags, informational signs, and electronic shelf labels. The liquid crystal layer can comprise a dispersion of the liquid crystal material in a polymer matrix. The conductive layers can be unpatterned.

A first photosensitive chiral additive can comprise the following structure:

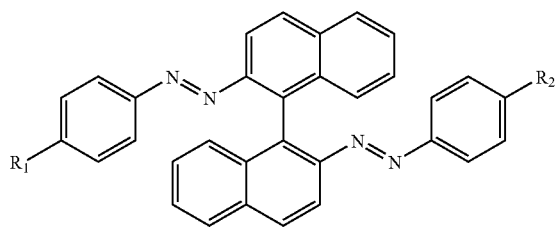

wherein $R_1$ and $R_2$ may independently be a straight chain or branched chain alkyl group which each contains at least one substituent selected from the group consisting of: any chiral center, halogen, $NO_2$, CN, O, S, C=C, C≡C, an aromatic group, a polyaromatic group, a heterocyclic group, a cycloalkyl group, and combinations thereof.

A second photosensitive chiral additive can comprise the following structure:

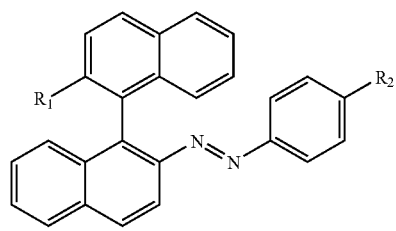

wherein $R_1$ and $R_2$ may independently be a straight chain or branched chain alkyl group which each contains at least one substituent selected from the group consisting of: any chiral center, halogen, $NO_2$, CN, O, S, C=C, C≡C, an aromatic group, a polyaromatic group, a heterocyclic group, a cycloalkyl group, and combinations thereof.

A third embodiment of the present invention features a chiral nematic liquid crystal photodisplay comprising:
  a liquid crystal layer including cholesteric liquid crystal material, the liquid crystal material comprising nematic liquid crystal and at least one photosensitive chiral additive;
  electrically conductive layers flanking the liquid crystal layer;
  electrical addressing means for applying an electric field to the liquid crystal layer between the conductive layers;
  a first light filter disposed near a viewing side of the display upstream of the liquid crystal layer relative to a direction of incident light used to view the display, the first light filter being able to absorb incident visible and ultraviolet light, the first light filter being movable between a closed position that covers the liquid crystal layer and an open position in which the liquid crystal layer is uncovered and in which regions of the liquid crystal layer are exposed to addressing electromagnetic radiation, wherein the photosensitive chiral additive is adapted to change a reflective wavelength of the liquid crystal layer at the exposed regions thereby producing a planar image in the planar texture of the liquid crystal layer; and
  a second light filter disposed on a side opposite the viewing side of the display downstream of the liquid crystal layer that absorbs visible light that passes through the liquid crystal layer.

Now specific aspects of this third embodiment of the invention will be discussed. The addressing radiation travels in the direction of incident light to the viewing side of the display and the first light filter possesses an absorption spectrum sufficient to prevent degradation of the planar image by the viewing light. The second light filter absorbs all of the visible incident light that passes the first filter and the liquid crystal layer such that the second filter appears black. The addressing radiation can travel opposite to the direction of incident light to the side opposite the viewing side of the display and the second filter permits transmission of the addressing radiation to the liquid crystal layer. The second filter can absorb the incident light of a particular color. The planar image can be erased from the planar texture by thermal relaxation of the exposed photosensitive chiral additive. The planar image is erased from the planar texture by exposure of visible light to the photosensitive chiral material. The addressing radiation can be ultraviolet light. The electric field can be applied in the form of a voltage pulse of a magnitude that places all of the liquid crystal material of the display in one of a focal conic texture or a homeotropic state resulting in the planar image not being displayed, and the electric field can be applied in the form of a voltage pulse of a magnitude that places all of the liquid crystal material of the display in the planar texture resulting in the planar image being displayed. The photodisplay can be incorporated into a device selected from the group consisting of: point of sales signs, debit cards, credit cards, name plates, name tags, informational signs, and electronic shelf labels. The liquid crystal layer can comprise a dispersion of the liquid crystal material in a polymer matrix.

The electrical addressing means can apply a voltage pulse to the conductive layers of a magnitude that switches unexposed regions, which are not exposed to the addressing radiation, to a focal conic texture producing a fixed positive image. The electrical addressing means can apply a voltage pulse to the conductive layers that returns the fixed positive image to the planar image. The voltage pulse is of sufficient magnitude to drive all of the chiral nematic material of the display to a homeotropic state during application of the pulse and into the planar texture following the pulse.

The electrical addressing means can apply a voltage pulse to the conductive layers of a magnitude that switches the exposed regions to a focal conic texture producing a fixed negative image. The electrical addressing means can apply a voltage pulse to the conductive layers that returns the fixed negative image to the planar image. The voltage pulse is of sufficient magnitude to drive all of the chiral nematic material of the display to a homeotropic state during application of the pulse and into the planar texture following the pulse. Both the fixed negative image and the fixed positive image can be displayed indefinitely without thermal degradation.

A fourth embodiment includes the photodisplay of the third embodiment and, in addition, optical addressing means for addressing the exposed regions of the liquid crystal layer with the addressing electromagnetic radiation of a particular wavelength.

The various specific aspects described in connection with the third embodiment are applicable to the fourth embodiment. In addition, the optical addressing means can be a device including a component selected from the group consisting of: a light emitting diode, an organic light emitting diode, a fluorescent display and a backlit liquid crystal display. The apparatus can include a mask including an image, the mask being interposed between the optical addressing means and the photodisplay for producing the planar image on the display.

Many additional features, advantages and a fuller understanding of the invention will be had from the accompanying drawings and the detailed description that follows. It should be understood that the above Disclosure of the Invention describes the invention in broad terms while the following Detailed Description describes the invention more narrowly and presents specific embodiments that should not be construed as necessary limitations of the invention as broadly defined in the claims.

DETAILED DESCRIPTION OF THE INVENTION

Figure 1:
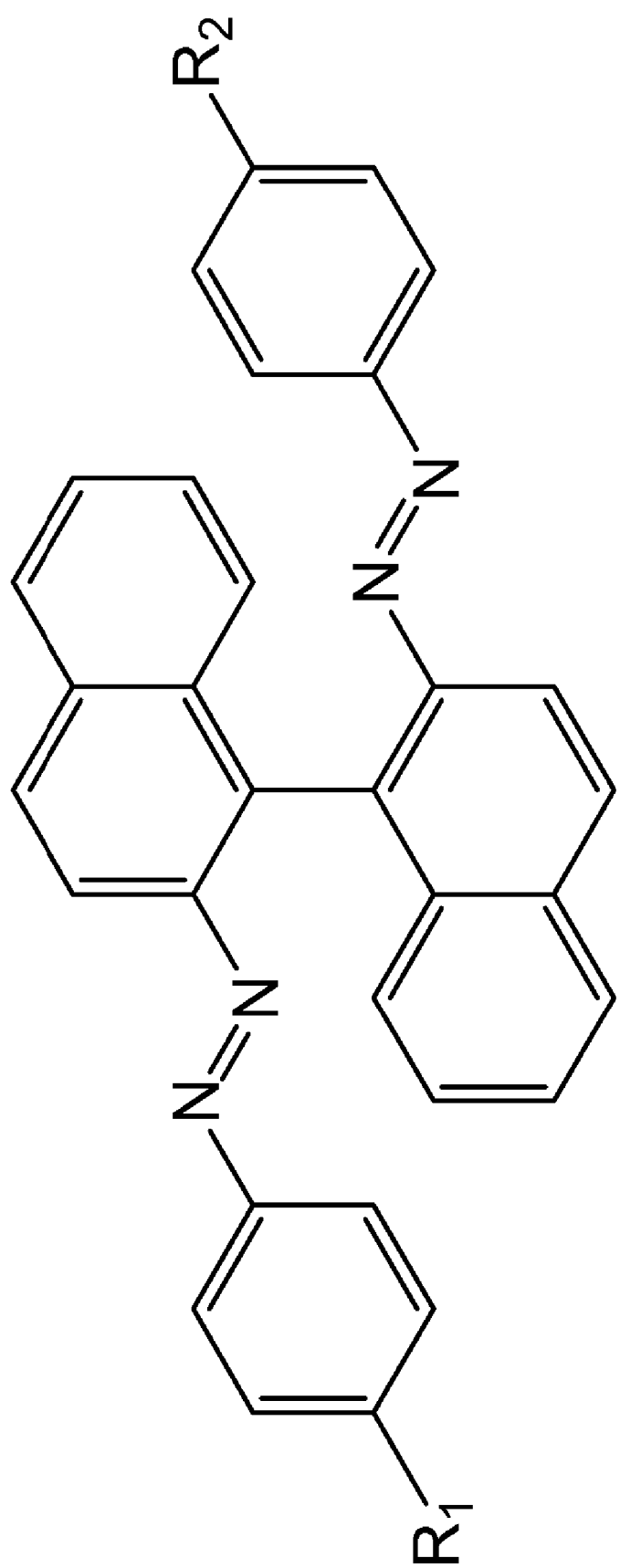
FIG. 1: Molecular structure of one present embodiment reversible photo responsive chiral compounds.

Disclosed are reversible photo responsive compounds and chiral nematic photo display devices whereby the chiral nematic material contains any photo responsive chiral additive that can be photoswitched between at least two different moieties each with different helical twisting powers. FIG. 1 shows the disclosed structure of the present exemplary embodiment reversible photo responsive chiral compounds where axially chiral binaphthyl group is (S) form or (R) form, and $R_1$ and $R_2$ may be any same or different which may contain one or more chiral centers. In the disclosed structure of the reversible photo responsive chiral compounds, axially chiral binaphthyl group may be (S) form or (R) form, and $R_1$ and $R_2$ may be the same or different any group, one of the two groups may contain one or more chiral centers. $R_1$ and $R_2$ may independently be a straight chain or branched chain alkyl group (C1-30) which may contain: any chiral center, halogen, $NO_2$, CN, O, S, C=C, C≡C, aromatic group, polyaromatic group, heterocyclic group, and/or cycloalkyl group.

Figure 2:
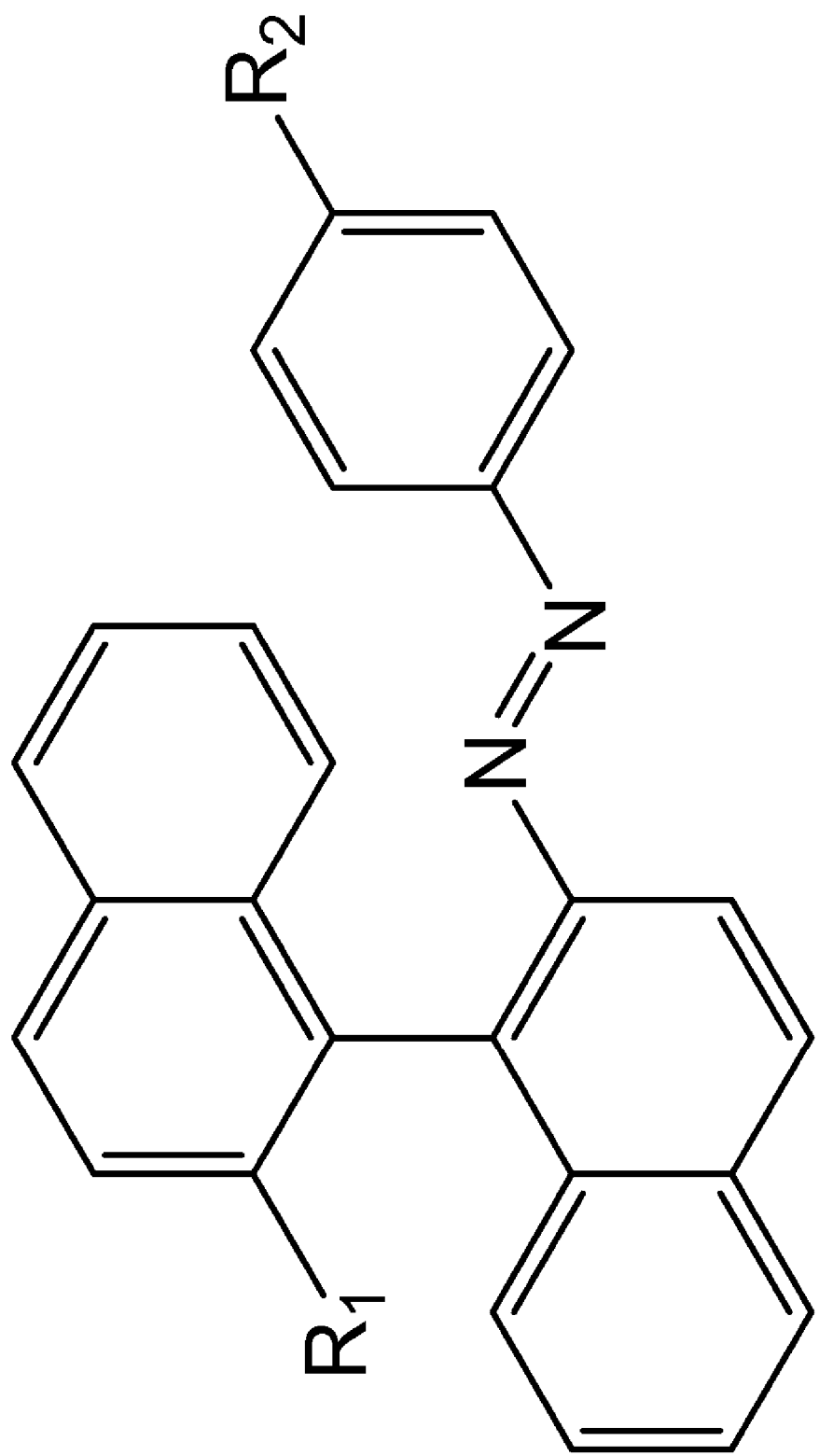
FIG. 2: Molecular structure of other present embodiment reversible photo responsive chiral compounds.

FIG. 2 shows the disclosed structure of the other present embodiment reversible photo responsive chiral compounds where axially chiral binaphthyl group is (S) form or (R) form, and $R_1$ and $R_2$ may be any same or different group which may contain one or more chiral centers. In the disclosed structure of the reversible photo responsive chiral compounds, axially chiral binaphthyl group is (S) form or (R) form, and $R_1$ and $R_2$ may be the same or different any group, one of the two groups must contain one or more chiral centers. $R_1$ and $R_2$ may independently be a straight chain or branched chain alkyl group (C1-30) which may contain: any chiral center, halogen, $NO_2$, CN, O, S, C=C, C≡C, aromatic group, polyaromatic group, heterocyclic group, and/or cycloalkyl group.

When one or more compounds in FIG. 1 or/and FIG. 2 are dissolved in either a nematic liquid crystal or a chiral nematic liquid crystal they form a photochiral nematic liquid crystal in which the pitch length of the chiral is changed upon exposure to ultraviolet light. This has the effect of changing the electrooptic properties of the photo responsive chiral nematic material. Compounds in FIG. 1 and FIG. 2 can exhibit high helical twisting powers in which case only small concentrations of the photo materials are often needed in order to twist the photochiral material to a pitch length sufficient to Bragg reflect light in the visible range showing iridescent colors in the planar texture of the chiral nematic phase. When dissolved in sufficient quantity, the photo responsive chiral materials can change the color of the reflected light by a perceptible amount.

Figure 3:
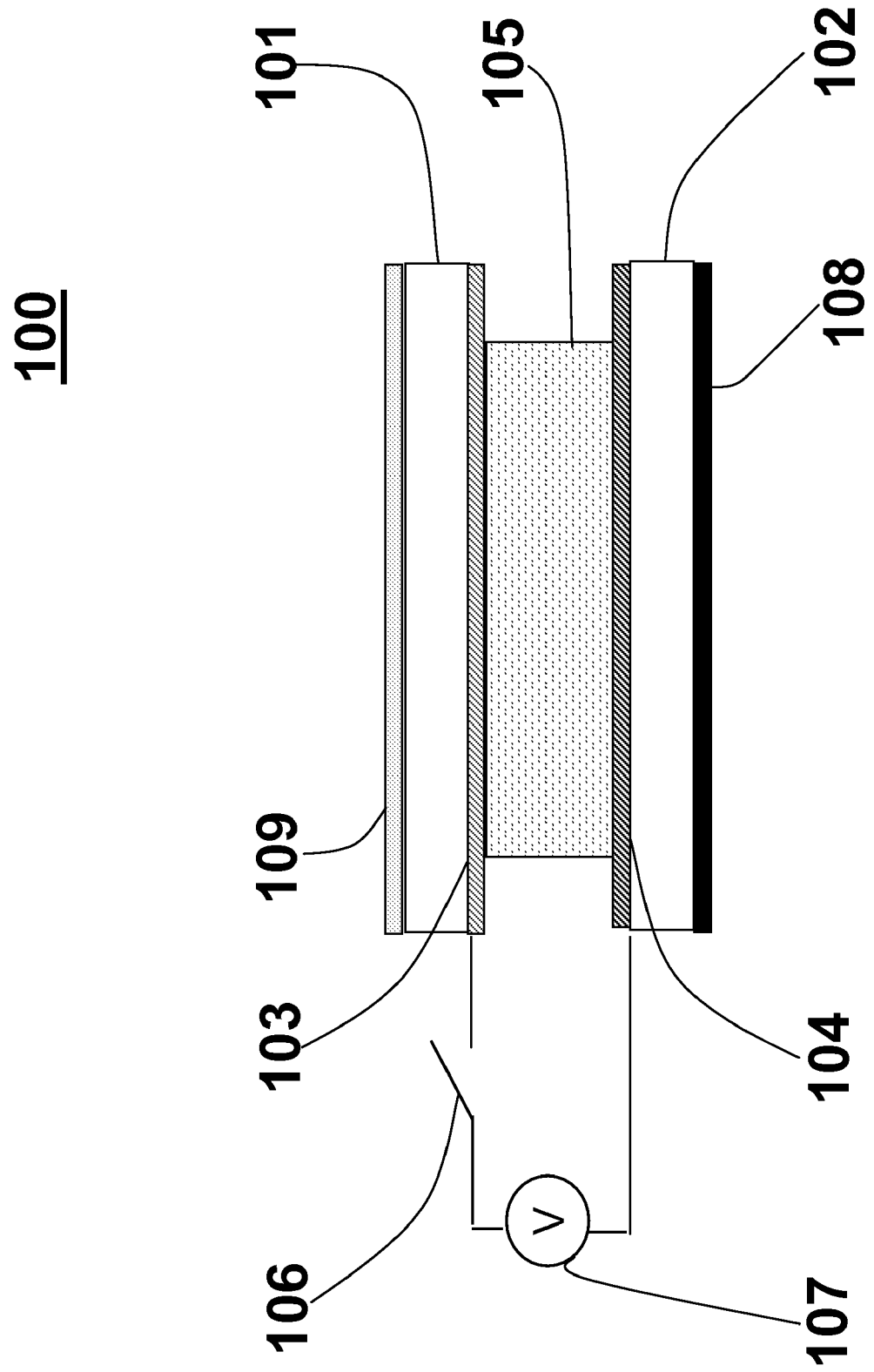
FIG. 3: Schematic side view of the photodisplay cell.

Referring to FIG. 3, the schematic of the side view of a photoaddressed display cell, 100 is shown which consists of substrates, 101 and 102. The upper substrate 101 must be transparent to ultraviolet and visible light while the lower substrate 102 may be transparent or an opaque absorber of light. It is not desired that the surface of 102 be reflective. Substrates 101 and 102 may of glass or polymeric materials as is common on prior art liquid crystal display technology.

Conducting electrodes 103 and 104 are formed on the surface of the substrates 101 and 102 respectively. The first conducting electrode, 103 must be transparent to UV and visible light. Preferred electrode materials for 103 and 104 are indium-tin-oxide (ITO), or a conducting polymer as is well known in the art of liquid crystal displays. It is not important, however that the lower conducting electrode 104 be transparent but can absorb light in the visible spectrum. It is not desired that the electrode 104 be reflective.

A light absorbing layer 108 is coated or laminated on a bottom of the display. A preferred color for this layer is black but can be any other color as may be selected to provided contrast or color to the display image as is known in the art of bistable chiral nematic displays as can be found for example in U.S. Pat. No. 5,493,430.

The electrooptic responsive layer 105 consists of a mixture of nematic liquid crystalline material and chiral molecular additives, at least one of which is a photochiral additive. The nematic material may itself be a mixture of many different liquid crystalline materials as is well known the art of liquid crystalline displays in order to achieve the desired performance. Desired nematic materials include commercial materials with high dielectric anisotropy and high birefringence such as from Merck products E7 or E44. The voltage applied to the electrodes depends upon the dielectric anisotropy. Therefore, nematic material that has a high dielectric anisotropy is selected when low voltages are desired. Furthermore, to achieve high reflective brightness of the viewed image the nematic liquid crystal should possess high birefringence. These are the same nematic material characteristics used in the art of bistable chiral nematic displays. At least one of the chiral additives to the nematic liquid crystal must by a photochiral additive that can change its helical twisting power upon being irradiated by ultraviolet, visible or infrared light in a direction indicated by 108. Preferred photo responsive chiral materials are compounds that exhibit a helical twisting power of at least $10 \,\mu m^{-1}$ (weight fraction); however, a higher twisting power of about $50 \,\mu m^{-1}$ or larger is generally desired. In the presence of ultraviolet or visible light the photo responsive chiral compound should exhibit a substantially different helical twisting power separated from the unexposed value by at least 10%. Again, it is desired that the difference between the exposed and the unexposed values be as large as possible, even perhaps changing the handedness of the helical twist. The photo responsive chiral additive may be mixed with other chiral compounds that are not necessarily photo responsive chirals. This mixing may be used to achieve a particular temperature dependence, to achieve addressing light sensitivity or to achieve a particular type of image such as a positive or negative image. The chiral material may exhibit a thermally stable HTP upon irradiation with UV light or it may relax to its original HTP over a period of time due to thermal agitation on visible light exposure. As will be described later, the latter property is the desired property for the invention described in order to be able to electronically erase and optically rewrite a new image.

Depending upon the light source that is used to view an image on the display, it may be necessary to have a light filter 109 covering surface of substrate 101. The purpose of the filter is to prevent the image from changing color or otherwise being degraded altogether because of the viewing light further shifting the HTP of the material. A desired filter 109 can be either a long pass filter with a particular cut-off wavelength or a band pass filter that eliminates a segment of the UV and visible spectrum thereby fixing the color of the image. If the absorption peak of the photochiral is sufficiently far into the ultraviolet, a filter may not be necessary when the device is viewed under ambient visible lighting conditions.

Figure 4:
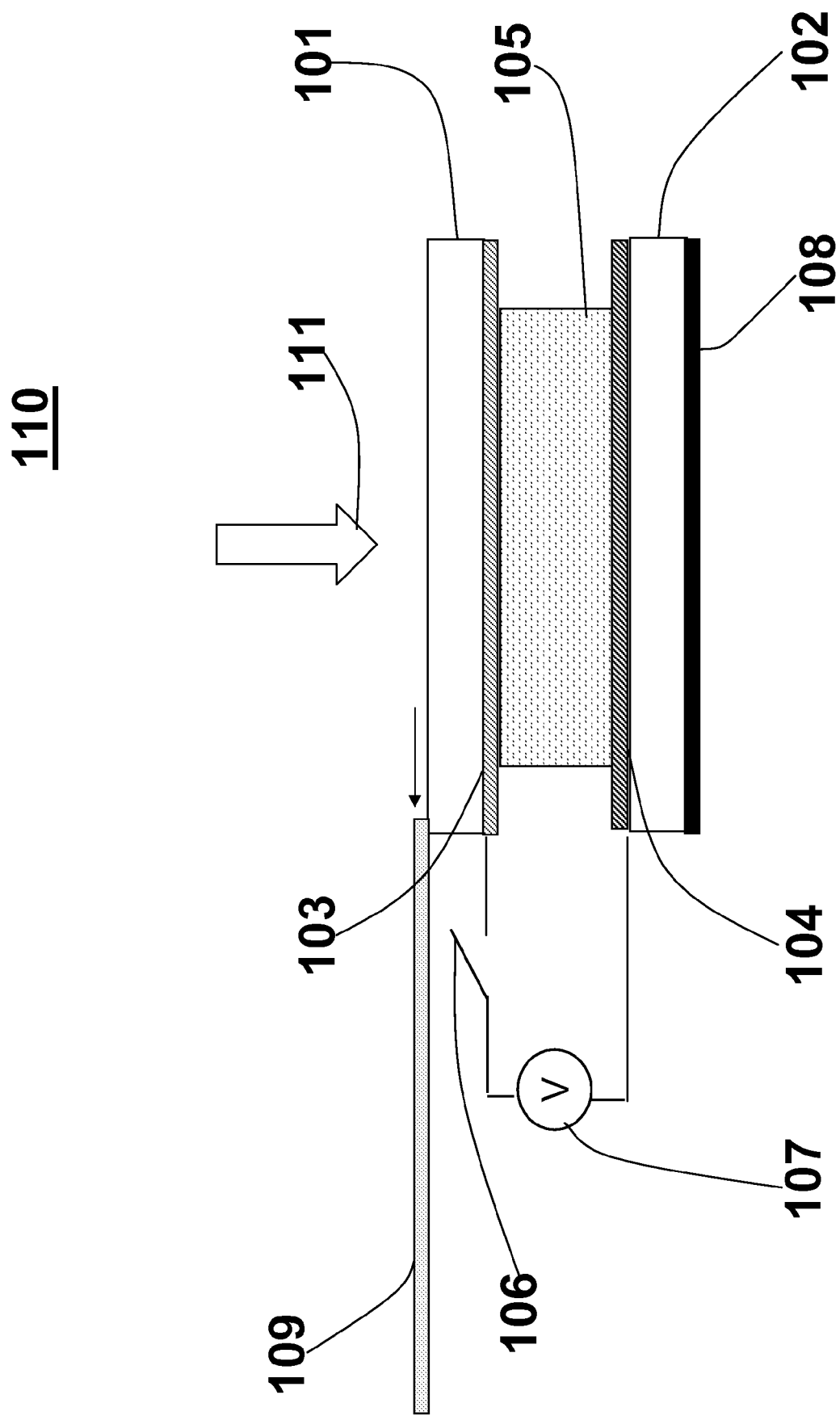
FIG. 4: Schematic side view of one present embodiment of the photodisplay cell optically addressed from the viewing side.

An image on photodisplay 100 is addressed on to the planar texture (planar image) of the chiral nematic material 105 by a writing light as indicated in one embodiment illustrated in FIG. 4 where the filter 109 is removed and the writing light (optical addressing device) directed as indicated by the arrow 111. The planar image may be created by shining UV light through a mask placed over the display cell or it may be created by a writing device such as an emissive display or light scanner. A simple writing device can be a backlit LCD, LED, OLED or fluorescent display with an emissive spectrum sufficient to excite the photochiral materials and change its HTP value. A digital high resolution image on the writing device is used to expose the planar texture of the photodisplay by placing it adjacent to the substrate 101 by lifting off or sliding the filter 109 if present. After exposure, filter 109 is returned to its original position as in the display 100 of FIG. 3 in order to prevent the viewing ambient visible light from degrading the image. Once the image is exposed to the planar texture, the planar image will thermally erase unless the exposed region is further switched to the focal conic state by use of an applied voltage, V, 107, applied by closing the switch 106. This image will be fixed and not thermally degrade. The value of the voltage required for this action is described later in the discussion of FIGS. 6 and 7.

It is desired that the switch 106 be an electronic switch applied through circuitry and that the applied voltage be in the form of a voltage pulse to drive the exposed material to the focal conic texture creating the fixed image, described later with regard to FIGS. 6 and 7. The switch 106 may also be used to drive all the material (exposed and unexposed) back into the planar texture. This can be used a means to electronically erase the fixed image.

Figure 5:
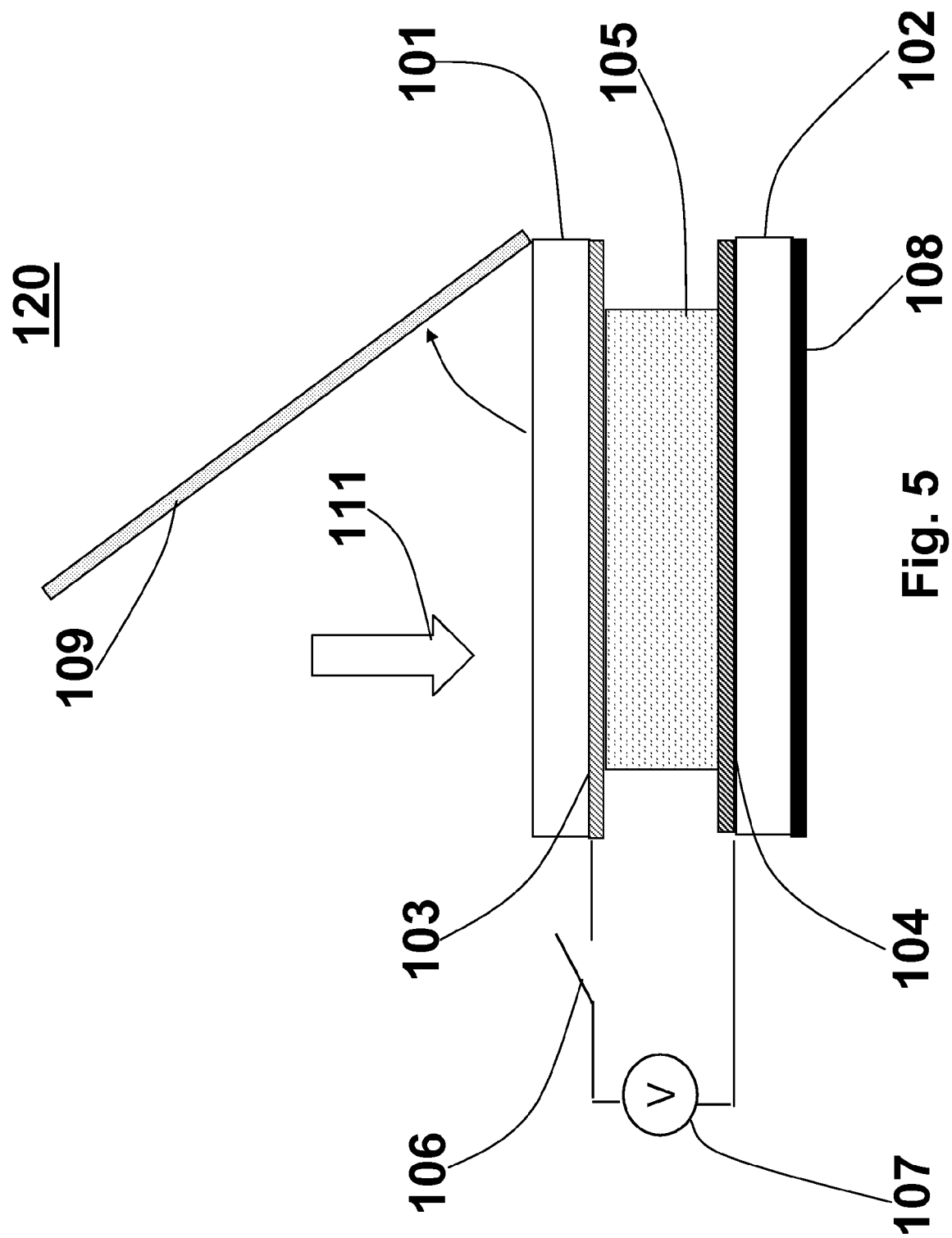
FIG. 5: Schematic side view of another present embodiment of the photodisplay cell optically addressed from the viewing side.

FIG. 5 is another embodiment of a photodisplay 120 where the filter 109 is hinged on one side to be lifted, thereby allowing the photodisplay to be imaged from the viewing side as indicated by the arrow 111. Once regions of the liquid crystal material have been exposed, filter 109 is closed to shield the display from UV light and prevent the viewing visible light from degrading the image.

Figure 6:
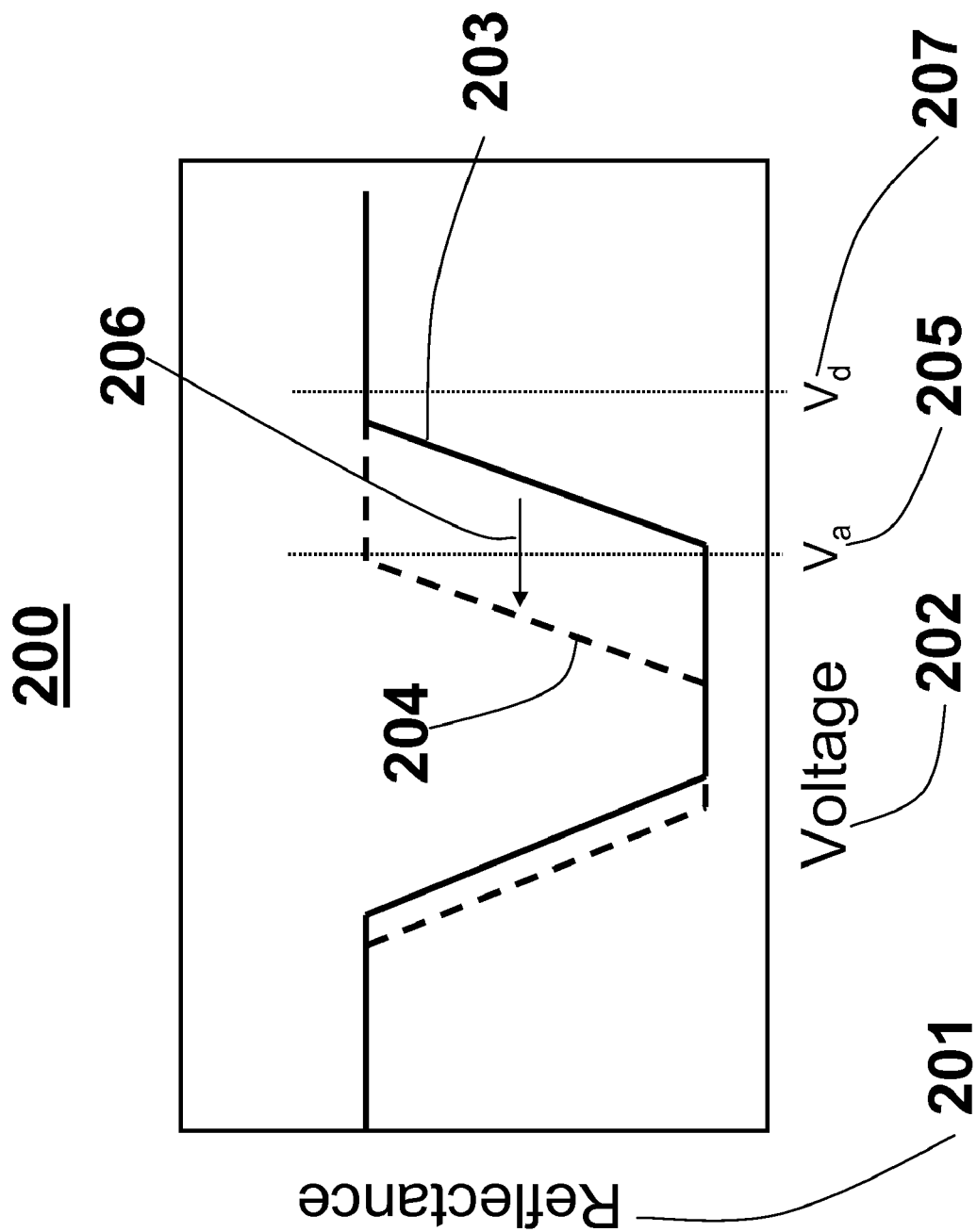
FIG. 6: Illustration of the electrooptical response curves from an exposed portion and an unexposed portion of a photodisplay designed to provide a fixed positive image.

FIG. 6 is used to describe the method of creating a fixed positive image that will remain on the display an indefinite period of time until it is either erased or rewritten with a new image.

FIG. 6 is an illustration 200 of the bathtub shaped electrooptic response curves for the unexposed regions of the liquid crystal layer (curve 203) and the exposed regions of the liquid crystal layer (curve 204) typical of a bistable chiral nematic display as for example described in U.S. Pat. No. 5,453,863. Specifically, 203 is the threshold of the unexposed response curve where the Reflectance 201 rises from the focal conic texture of low reflectance to the planar texture of high reflectance for chiral regions of the display that have not been exposed. In regions that have been suitably exposed with addressing radiation, however, the electrooptic curve and its threshold are changed to 204. This comes about because the pitch length of chiral nematic has changed and hence the drive voltage has changed. In the case of FIG. 6, the pitch length has become longer shifting the voltage threshold curve 204 to lower voltages. When a voltage pulse of value $V_a$, 205, is applied the unexposed regions of the display are switched to the focal conic state while the exposed regions of the display are in the planar state. Since the focal conic state is a thermally stable state, this image is a fixed image and preserved indefinitely without thermal degradation until it is electronically erased. Since it is the unexposed regions that are switched the resulting image is referred to as a fixed positive image.

The fixed image will remain on the display device indefinitely whereas the planar image will thermally degrade. Molecular self diffusion will also not degrade the fixed image. The fixed image can, however, be erased by applying a higher voltage pulse of a value $V_d$ indicated by 207 of FIG. 6 sufficient to drive all the material (exposed and unexposed) into the planar texture. Complete electronic erasure of the fixed image will occur after the planar image has had time to thermally erase. Once erased, a new image can be optically addressed to the photo display.

Figure 7:
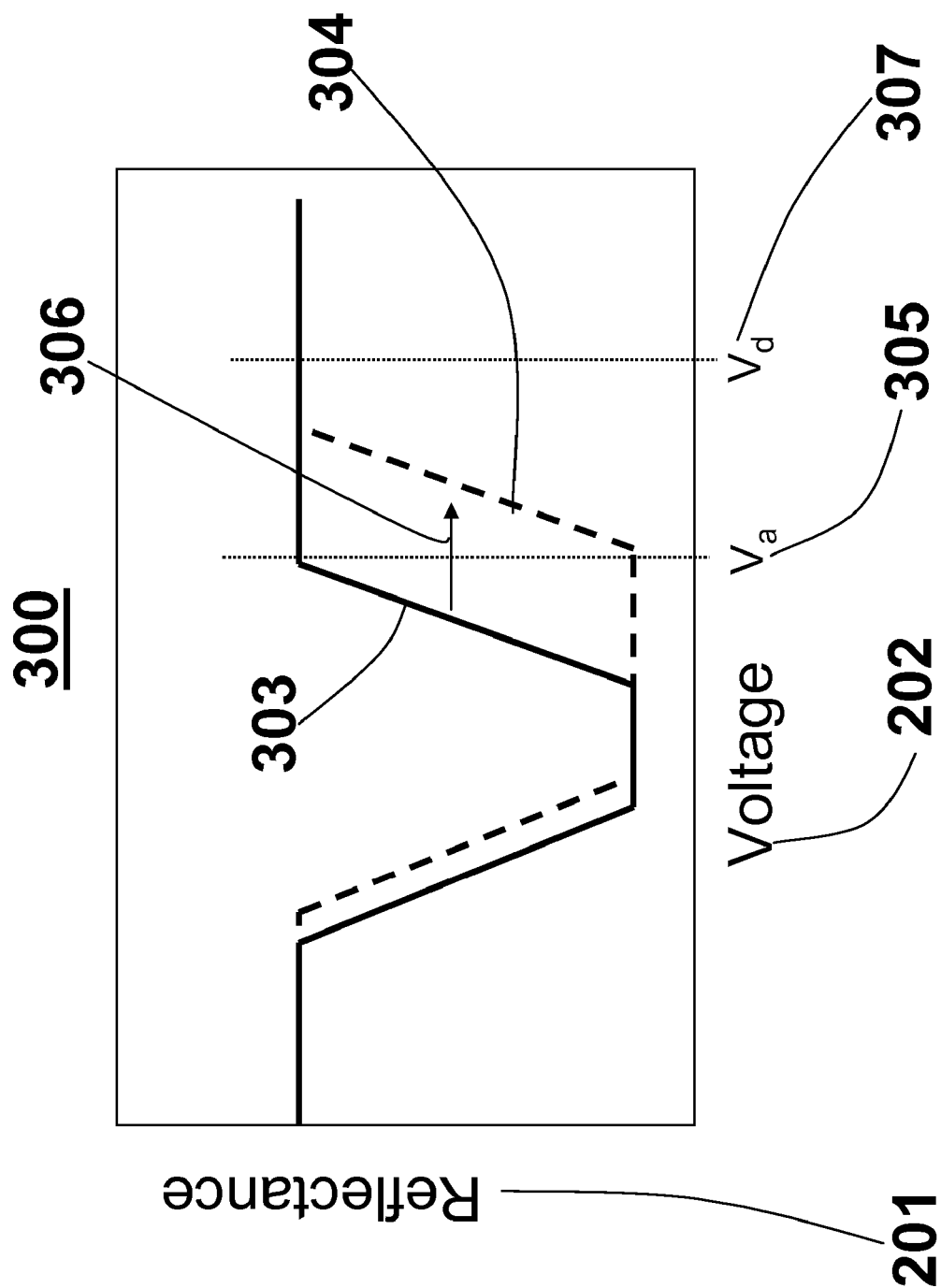
FIG. 7: Illustration of the electrooptical response curves from an exposed portion and an unexposed portion of a photodisplay designed to provide a fixed negative image.

FIG. 7 is used to describe the method of creating a fixed negative image that will remain on the display an indefinite period of time until it is either erased or rewritten with a new image. FIG. 7 is an illustration of the electrooptic response curves for the unexposed regions of the liquid crystal layer (curve 303) and the exposed regions of the liquid crystal layer (curve 304) typical of a bistable chiral nematic display as for example described in U.S. Pat. No. 5,453,863. Specifically, 303 is the threshold of the unexposed response curve where the Reflectance 201 rises from the focal conic texture of low reflectance to the planar texture of high reflectance for chiral for regions of the display that has not been exposed. In regions that have been suitably exposed, however, the electrooptic curve and its threshold has been changed, 304. This comes about because the pitch length of chiral nematic has changed and hence the drive voltage has changed. In the case of FIG. 7, the pitch length has become shorter shifting the voltage threshold 304 to higher voltages. When a voltage pulse of value $V_a$ 305, is applied, the exposed regions of the display are switched to the focal conic state while the unexposed regions are in the planar state. Since the focal conic state is a thermally stable state, this image is a fixed image and preserved indefinitely without thermal degradation until it is electronically erased. Since it is the exposed regions that are switched the resulting image is referred to as a fixed negative image.

This fixed negative image will remain on the display device indefinitely whereas the planar image will thermally degrade. Molecular self diffusion will also not degrade the fixed image. The fixed image can, however, be erased by applying a higher voltage pulse of a value $V_d$ indicated by 307 of FIG. 7 sufficient to drive all the material (exposed and unexposed) into the planar texture. Complete electronic erasure of the fixed image will occur after the planar image has had time to thermally erase. Once erased, a new image can be optically addressed to the photo display.

Figure 8:
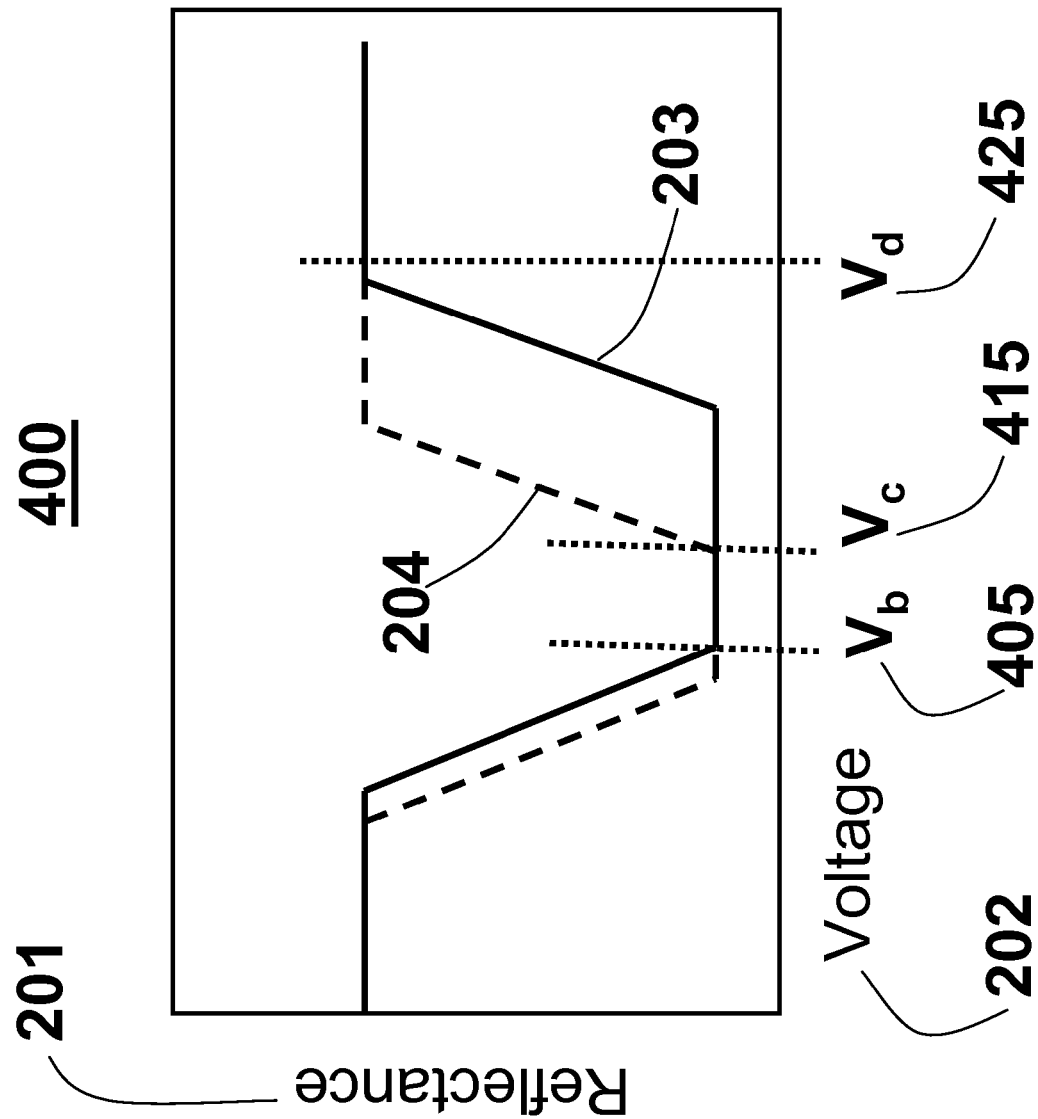
FIG. 8: Illustration of the electrooptical response curves from an exposed portion and an unexposed portion of a photodisplay showing the voltages applied to hide an image in the planar texture.

In another embodiment of this invention a planar image in the planar texture can be hidden then made to reappear. This is described with the aid of FIG. 8 which is an illustration of the electrooptical response curves from an exposed portion and an unexposed portion of a photodisplay. Exposure of the display with an image transfers a planar image to the planar texture of the display. Voltages applied to the display in the range between $V_b$ and $V_c$, 405 and 415 will drive the entire display into the focal conic texture whereby the planar image is hidden from view. Applying a voltage pulse higher than $V_d$ 425 will drive the entire display back into the planar texture where the planar image will reappear.

Figure 9:
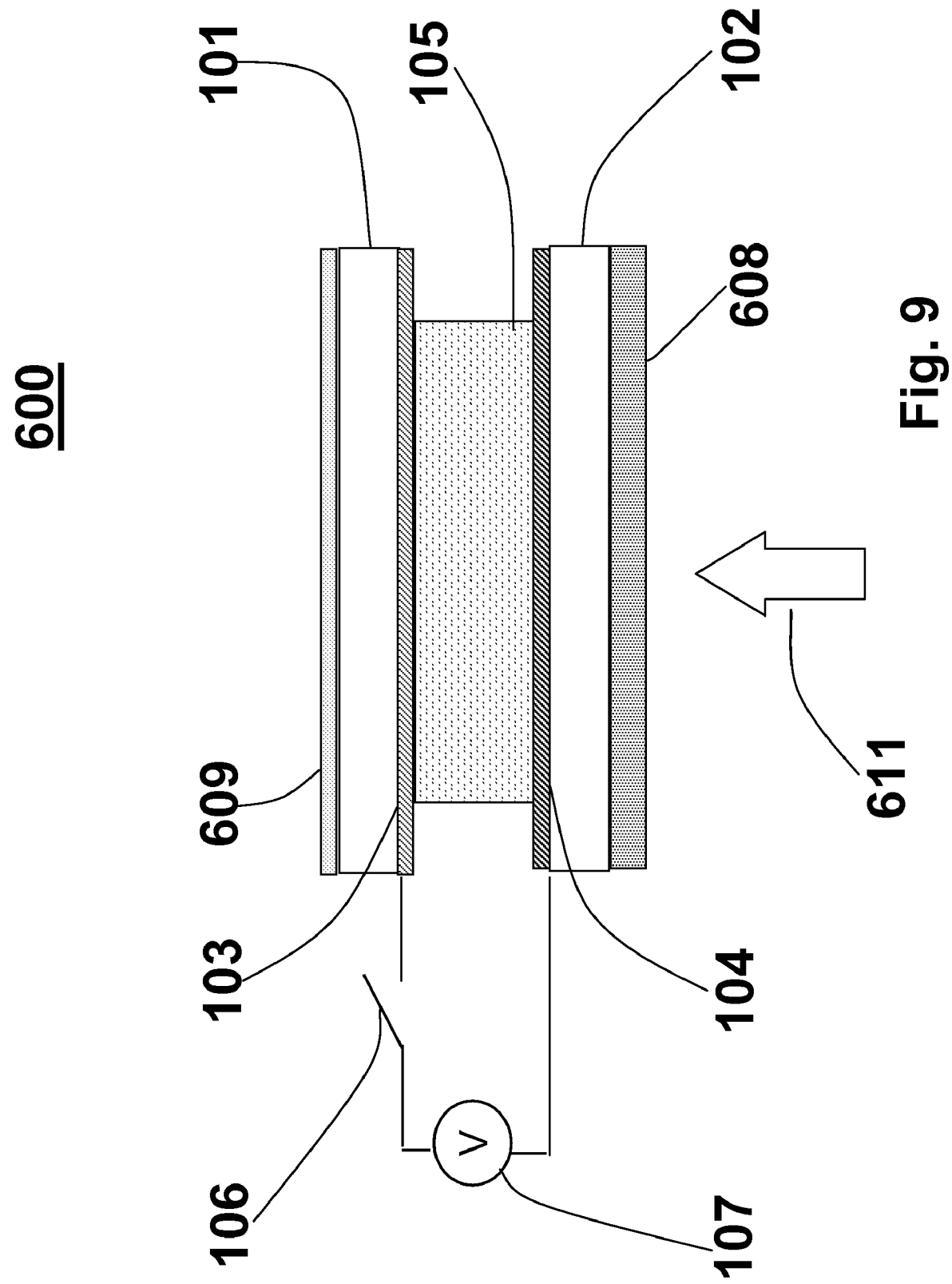
FIG. 9: Schematic side view of the photodisplay cell optically addressed from the non-viewing side.
Figure 10:
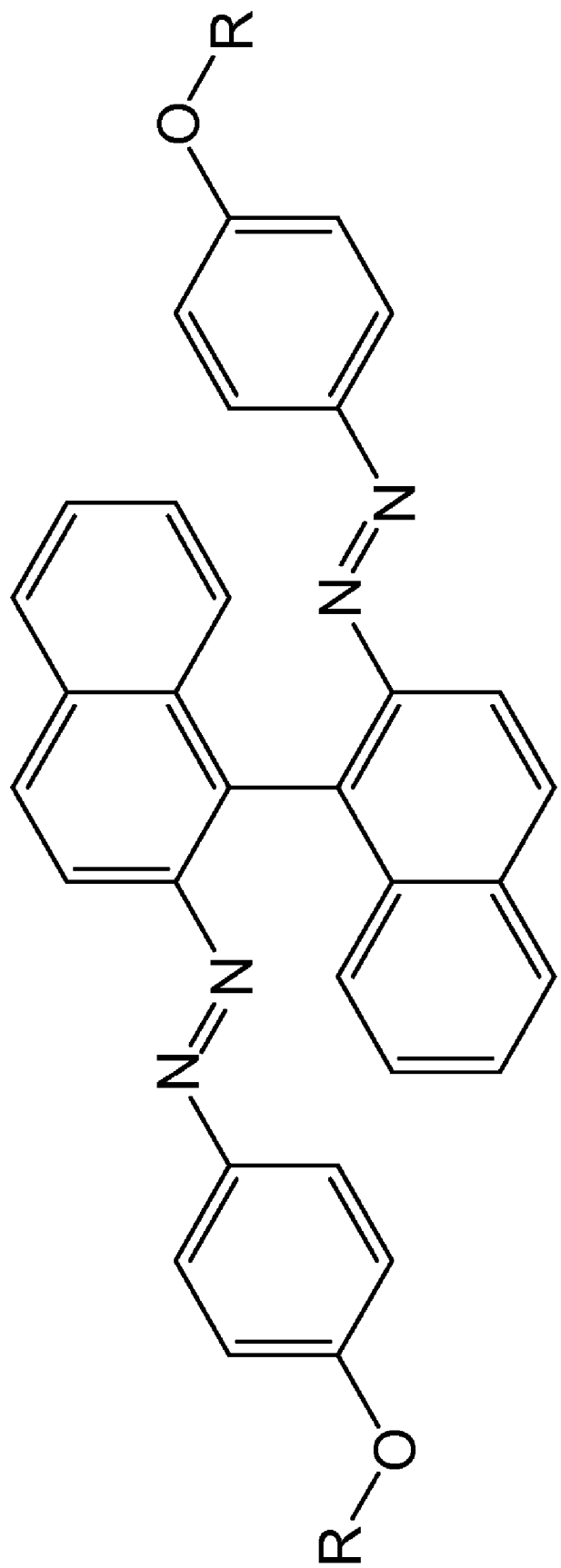
FIG. 10: Molecular structures of the specific exemplary compounds (Example 1).
Figure 11:
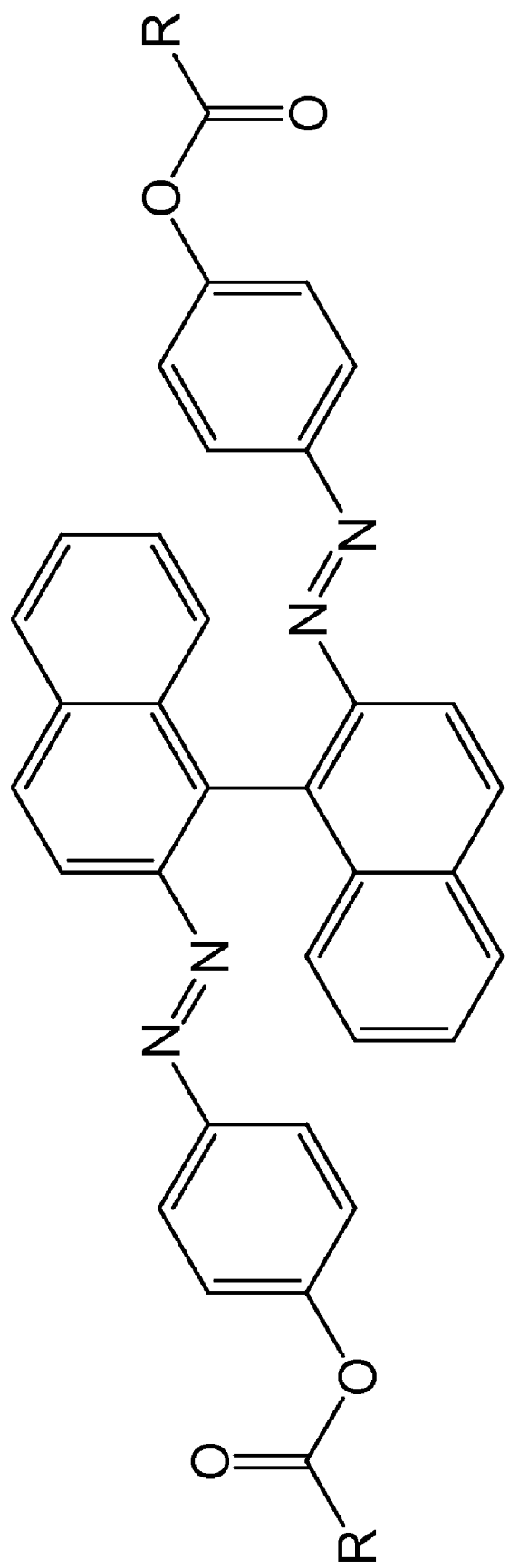
FIG. 11: Molecular structures of the specific exemplary compounds (Example 1).

FIG. 9 shows another embodiment of the photodisplay that is addressed on the non-viewing side of the display. The photodisplay device of FIG. 9 is similar in several ways to the photodisplay device of FIG. 3 except that the light absorbing layer, 108, of FIG. 3 is replaced by an absorbing light filter, 608 in FIG. 9. Filter 608 is transmissive to the UV light that is imaging the display but not transmissive to a segment of the visible spectrum used to view the display and provide contrast to the image. The device of FIG. 9 is addressed on the non-viewing side by ultraviolet light in a direction indicated by arrow, 611. 609 is an optical filter that absorbs UV light and a portion of the visible light spectrum, preventing ambient light used in viewing the display from degrading the image. In cases where ambient light degrades the image, the display needs to be mounted so that the back of the display, 608, is against a wall or shield preventing the ambient light from exposure to the non viewing side.

EXAMPLES

The following examples are presented to illustrate the practice of this invention but are not meant to limit it in any way. All percentages are by weight unless otherwise indicated.

Example 1

Reversible photo responsive chiral compounds of the structure diagramed in FIG. 1 with end chains: 3a) R=OC$_8$H$_{17}$, 3b) R=OC$_{10}$H$_{21}$, 3c) R=OC$_{12}$H$_{25}$, and 3d) R=OC$_{14}$H$_{29}$ respectively were synthesized to explore their physical characteristics for photodisplay applications. In addition reversible photo responsive chiral compounds of the structure diagramed in FIG. 2 with end chains R=C$_n$H$_{2n+1}$ (e.g. 4a R=C$_{11}$H$_{23}$ and 4b R=C$_2$H$_5$) respectively were also synthesized for comparison.

The reversible photo responsive chiral compounds were synthesized according to the following scheme.

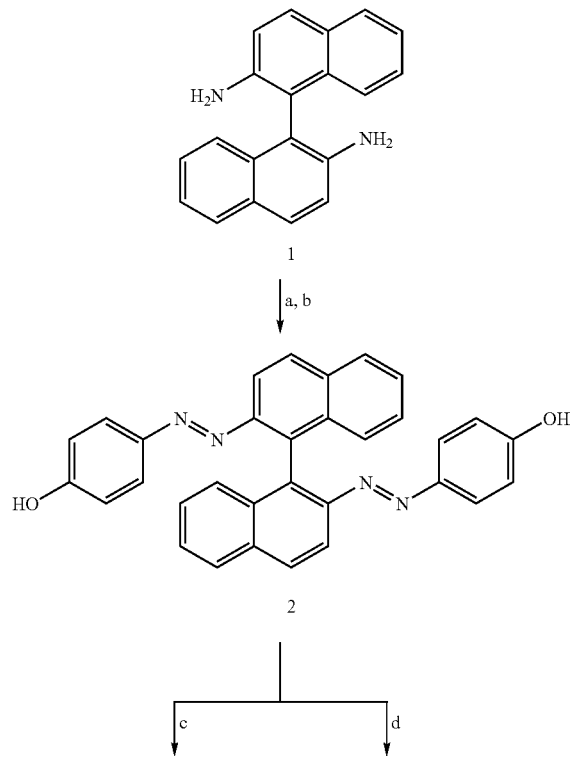

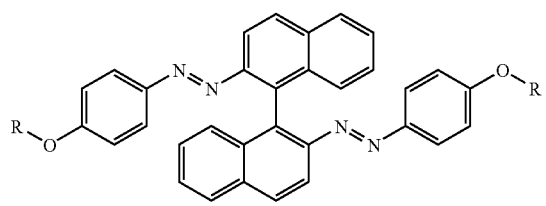

3

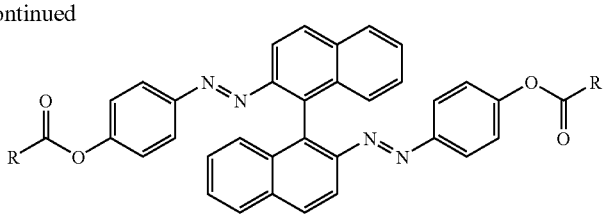

4 a ... (i) Aqueous HCl or $H_2SO_4$, (ii) $NaNO_2$
b ... Phenol, NaOH, $H_2O$
c ... RBr, $K_2CO_3$, DMF
d ... RCOCl, $Et_3N$, $CH_2Cl_2$ Synthesis of the intermediate 2:

(S)-(−)-1,1'-Binaphthyl-2,2'-diamine or (R)-(+)-1,1'-binaphthyl-2,2'-diamine (1.00 g, 3.52 mmol) was dissolved in a solution of $H_2O$ (17 mL) and concentrated HCl (2.5 mL). The solution was cooled to 0° C. at ice water bath. A solution of sodium nitrite (0.58 g, 8.44 mmol) in $H_2O$ (10 mL) was dropped at ice water bath with stirring. The resulting brown yellow suspension was dropped to the solution of Phenol (0.73, 7.74 mmol) and NaOH (0.90 g, 22.60 mmol) in $H_2O$ (15 mL). The suspension was acidified with aqueous HCl and filtered. The precipitate was washed with $H_2O$, dried to get the crude 2, which was purified by chromatography on silica gel to give a solid in 80-90% yields.

The general procedure for the synthesis of the photo responsive chiral compound 3:

The mixture of the intermediate 2 (1.40 mmol), alkyl bromide (4.20 mmol) and potassium carbonate (4.20 mmol) in DMF (50 mL) was heated with stirring for 5-48 h. The resulting mixture was evaporated to dryness under reduced pressure. The residue was purified by chromatography on silica gel to get the chiral compounds 3 in 60-90% yields.

For example:

(S)-(−) Binaphthyl diazo compound 3a: mp 93-94° C. $^1$H NMR ($CDCl_3$): δ 0.87 (t, 6H), 1.26 (m, 20H), 1.70 (m, 4H), 3.88 (t, 4H, J=6.6 Hz), 6.71 (d, 4H, J=8.8 Hz), 7.27 (m, 2H), 7.30 (d, 4H, J=9.2 Hz), 7.48 (m, 4H), 7.97 (d, 2H, J=8.2 Hz), 8.04 (d, 2H, J=9.0 Hz), 8.16 (d, 2H, J=9.2 Hz); $^{13}$C NMR ($CDCl_3$): δ 14.05, 22.61, 25.93, 29.11, 29.17, 29.26, 31.77, 68.22, 114.43, 114.49, 124.57, 126.51, 126.84, 127.82, 128.01, 128.92, 134.20, 134.34, 136.62, 147.27, 148.37, 161.27; MALDI-TOF MS (M+Na) calcd for $C_{48}H_{54}N_4O_2Na$: 741.4144. found: 741.4131. Anal. calcd for $C_{48}H_{54}N_4O_2$: C, 80.19; H, 7.57; N, 7.79. Found: C, 80.27; H, 7.40; N, 7.74.

(S)-(−) Binaphthyl diazo compound 3b: mp 89-90° C. $^1$H NMR ($CDCl_3$): δ 0.86 (t, 6H), 1.25 (m, 28H), 1.71 (m, 4H), 3.88 (t, 4H, J=6.5 Hz), 6.71 (d, 4H, J=9.0 Hz), 7.27 (m, 2H), 7.29 (d, 4H, J=9.0 Hz), 7.47 (m, 4H), 7.97 (d, 2H, J=8.2 Hz), 8.04 (d, 2H, J=9.2 Hz), 8.15 (d, 2H, J=9.2 Hz); $^{13}$C NMR ($CDCl_3$): δ 14.09, 22.67, 25.95, 29.13, 29.29, 29.32, 29.53, 31.82, 68.23, 114.42, 114.49, 124.56, 126.49, 126.82, 127.81, 127.99, 128.90, 134.19, 134.33, 136.60, 147.25, 148.35, 161.24; MALDI-TOF MS (M+H) calcd for $C_{52}H_{63}N_4O_2$: 775.4951, found: 775.4960. Anal. calcd for $C_{52}H_{62}N_4O_2$: C, 80.58; H, 8.06; N, 7.23. Found: C, 80.33; H, 7.79; N, 7.10.

(S)-(−) Binaphthyl diazo compound 3c: mp 76-77° C. $^1$H NMR ($CDCl_3$): δ 0.87 (t, 6H), 1.25 (m, 36H), 1.71 (m, 4H), 3.88 (t, 4H, J=6.6 Hz), 6.70 (d, 4H, J=8.8 Hz), 7.27 (m, 2H), 7.30 (d, 4H, J=8.8 Hz), 7.47 (m, 4H), 7.76 (d, 2H, J=8.2 Hz), 8.03 (d, 2H, J=9.0 Hz), 8.15 (d, 2H, J=9.0 Hz); $^{13}$C NMR ($CDCl_3$): δ 14.08, 22.66, 25.94, 29.11, 29.32, 29.52, 29.55, 29.61, 31.90, 68.23, 114.43, 114.49, 124.57, 126.51, 126.84, 127.82, 128.00, 128.91, 134.20, 134.33, 136.62, 147.25, 148.36, 161.27; MALDI-TOF MS (M+Na) calcd for $C_{56}H_{70}N_4O_2Na$: 853.5396. found: 853.5390, Anal. calcd for $C_{56}H_{70}N_4O_2$: C, 80.92; H, 8.49; N, 6.74. Found C, 80.07; H, 8.37; N, 6.71.

(S)-(−) Binaphthyl diazo compound 3d: orange crystal, mp 52-54° C. $^1$H NMR ($CDCl_3$): δ 0.88 (t, 6H), 1.25 (m, 44H), 1.71 (m, 4H), 3.88 (t, 4H, J=6.6 Hz), 6.70 (d, 4H, J=8.6 Hz), 7.27 (m, 2H), 7.29 (d, 4H, J=9.2 Hz), 7.47 (m, 4H), 7.96 (d, 2H, J=8.0 Hz), 8.03 (d, 2H, J=8.8 Hz), 8.15 (d, 2H, J=9.2 Hz); $^{13}$C NMR ($CDCl_3$): δ 14.06, 22.65, 25.91, 29.08, 29.30, 29.50, 29.53, 29.61, 31.89, 68.17, 114.37, 114.45, 124.51, 126.44, 126.77, 127.76, 127.94, 128.84, 134.14, 134.28, 136.56, 147.21, 148.31, 161.19; MALDI-TOF MS (M+H) calcd for $C_{60}H_{79}N_4O_2$: 887.6203, found: 887.6212; Anal. calcd for $C_{60}H_{78}N_4O_2$: C, 81.22; H, 8.86; N, 6.31. Found: C, 81.47; H, 8.86; N, 6.17.

The general procedure for the synthesis of the photo responsive chiral compound 4:

A solution of acyl chloride (1.4 mmol) in $CH_2Cl_2$ (10 mL) was added to the mixture of the intermediate 2 (0.7 mmol) and $Et_3N$ (1.4 mmol) in $CH_2Cl_2$ (10 mL). The mixture was stirred for 1-5 h. The resulting mixture was evaporated to dryness under reduced pressure. The residue was purified by chromatography on silica gel to get orange solid 4 in 50-95% yields.

For example:

(S)-(−) binaphthyl diazo compound 4a (R=$C_{11}H_{23}$): mp 55-56° C.; Yield: 66%; $^1$H NMR ($CDCl_3$): δ 0.88 (t, 6H), 1.26 (m, 32H), 1.66 (m, 4H), 2.49 (t, 4H, J=7.3 Hz), 6.94 (d, 4H, J=9.2 Hz), 7.30 (m, 2H), 7.32 (d, 4H, J=9.2 Hz), 7.49 (m, 4H), 7.98 (d, 2H, J=8.2 Hz), 8.05 (d, 2H, J=8.8 Hz), 8.14 (d, 2H, J=8.8 Hz); $^{13}$C NMR ($CDCl_3$): δ 14.06, 22.64, 24.85, 29.02, 29.19, 29.28, 29.39, 29.54, 29.67, 31.87, 34.33, 114.19, 121.80, 123.85, 126.71, 127.29, 127.78, 128.05, 129.09, 134.17, 134.45, 137.41, 148.15, 150.37, 152.33, 171.74.

The light-induced configuration isomerization of the specific exemplary compounds 3a, 3b, 3c, 3d, 4a, and 4b was found to occur when irradiated with ultraviolet and visible light.

Example 2

The helical twisting power, HTP, of the compounds 3a-d and 4a,b was measured by dissolving a known quantity of material in a nematic liquid crystal host and measuring the induced helical pitch length, in this case, by observing the wavelength of visible light reflected from the Bragg reflective material. The nematic host was E7, a eutectic mixture of liquid crystal components commercially available from Merck. The chiral material to be investigated was dissolved in the nematic host in sufficient quantity to form a chiral nematic material that was Bragg reflective in the visible spectrum. The HTP was measured in a display cell fabricated from two glass substrates (2 in×2 in) each coated with a transparent conductor indium tin oxide (ITO), which was over-coated with a hard coat layer and a polyimide alignment layer. The two glass pieces are held together with a gasket material and spacers to maintain a cell thickness of 5 microns. The back surface of the cell, opposite the viewing side, is painted with a black spray paint. A small gap is left in the gasket material to fill the cell with the chiral nematic liquid crystal mixture performed in a vacuum chamber. The display cell was held in the dark for over 30 hours then the reflective wavelength measured with a spectrometer in an integrating sphere with a strobe white light source with a short strobe time. Values of HTP calculated from the measured wavelength, known chiral/host concentrations and the host refractive index. These values are shown in Table I below for both molar fraction and weight fraction concentrations.

TABLE I

The helical twisting power of chiral dopants in E7 nematic host in the initial (trans-trans) configuration

| | E7 Host | |
|---|---|---|
| Dopant | HTP (molar) $\mu m^{-1}$ | HTP (wt %) $\mu m^{-1}$ |
| 3a | 153 | 60 |
| 3b | 158 | 57.5 |
| 3c | 172 | 58 |
| 3d | 166 | 53 |
| 4a | 171 | 57 |
| 4b | 116 | 55 |

Example 3

A fixed negative photo image was created on a display cell. The display cell was fabricated from of two glass substrates (2 in×2 in) each coated with a transparent conductor indium tin oxide (ITO), which was overcoated with a hard coat layer and a polyimide alignment layer. The two glass pieces are held together with a gasket material and spacers to maintain a cell thickness of 5 microns. A small gap is left in the gasket material to fill the cell with the photochiral liquid crystal mixture. The cell is filled in a vacuum chamber with cholesteric liquid crystal mixture consisting of 0.8% 3b (left-handed photo-chiral dopant), 15.87% E44 (nematic host, Merck), and 83.33% BLO61 (mixture of a nematic host with right-handed chiral dopant, Merck). Once filled, the cell is placed in a bladder press at 6 psi for 30 minutes to press the cell to a uniform thickness. After 30 minutes, the cell is sealed with Hardman's two-part epoxy. Once the epoxy is cured, the cell is back painted with black spray paint. The completed cell is placed in the darkness for the period of a day then placed in ambient light for viewing. The display cell appeared red with a Bragg reflective peak measured at 636 nm. After UV exposure for 10 seconds (637 $\mu W/cm^2$ at $\lambda_{max}$=365 nm) the pitch length of the cholesteric LC decreases resulting in a green reflective color with a Bragg peak at 554 nm. The pitch length change is due to the reduction of the twisting power of the photo-chiral dopant after photo-isomerization. Exposure through a mask leads to a two color image formed by regions with two different cholesteric pitch lengths, a red unexposed area and green exposed area.

Figure 12:
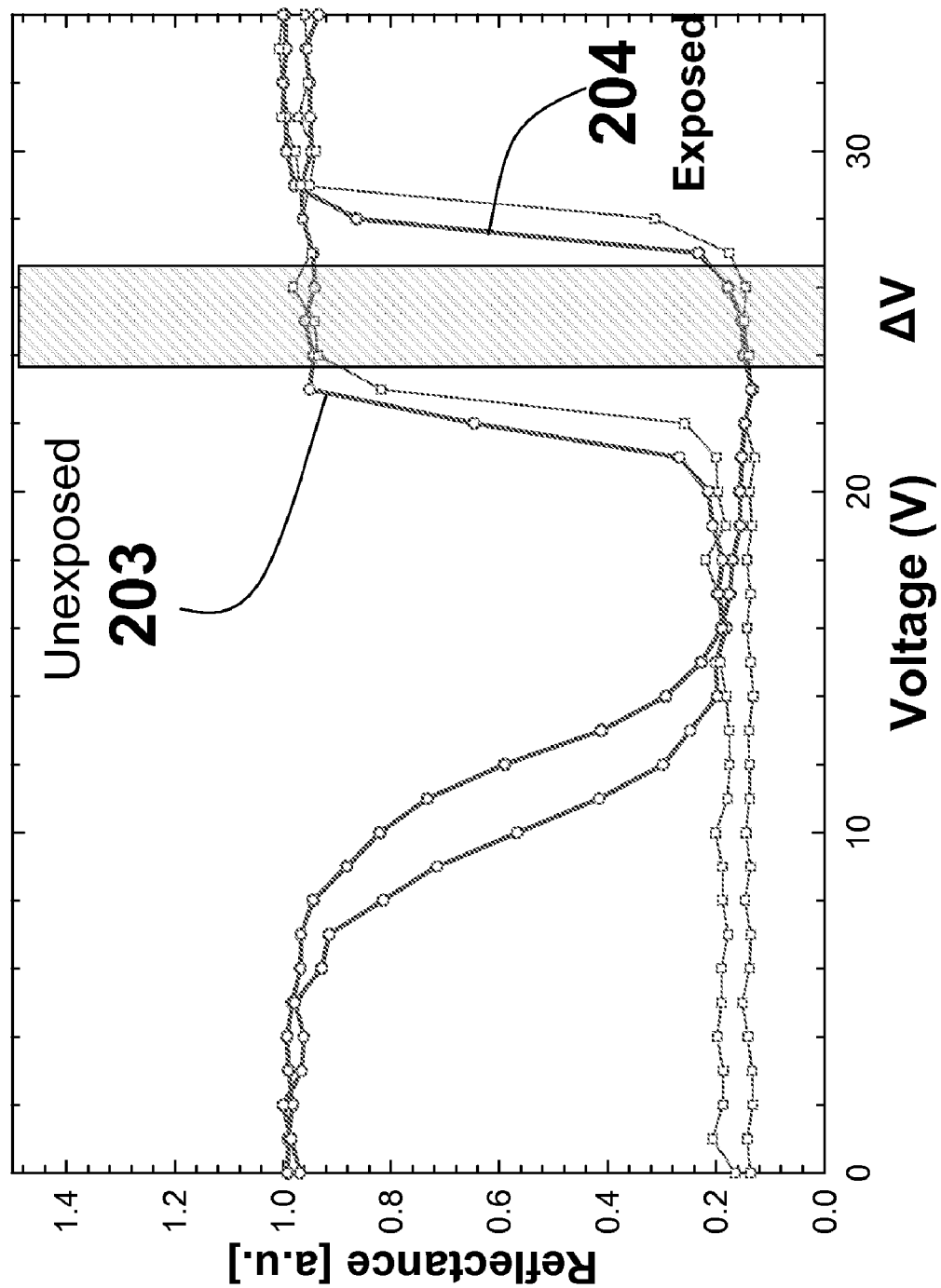
FIG. 12: Electrooptic response curves used in Example 3.

The electrooptic curves for the exposed and unexposed regions are shown in FIG. 12 Applying a voltage pulse in the range $\Delta V$ in FIG. 12 switches the exposed region of the display to the transparent focal conic state; the unexposed region to the planar state. The result is a black image (created by the black coating on the display) on a red reflective background. The image is fixed and not degraded. The image can be erased by switching at voltages above or below the $\Delta V$ after thermal relaxation of the exposed regions or by heating the display cell above the isotropic transition of the material.

Example 4

A fixed positive photo image was created on a cell. The display cell was fabricated as described in Example 3 except filled with a different cholesteric liquid crystal mixture. The mixture has 6.0% compound 3b, and 94% nematic host, (a commercial high birefringence, high dielectric anisotropy nematic mixture by Merck). Once filled, the cell is placed in a bladder press at 6 psi for 30 minutes to press the cell to a uniform thickness. After 30 minutes, the cell is sealed with Hardman's two-part epoxy. Once the epoxy is cured, the cell is back painted with black spray paint and placed in the darkness for several days. Upon removal from the darkness, the display cell appears green in ambient room light with a Bragg reflective peak at 530 nm. The display cell was masked with an image and the cell exposed through the mask to UV light (637 $\mu W/cm^2$ at $\lambda_{max}$=365 nm) for 10s. Exposed regions change the reflected color to red, while unexposed regions stay green. Application of a voltage transfers the unexposed green regions to transmissive focal conic state, while exposed red regions remain red in the planar texture. A fixed positive image therefore is displayed on the photodisplay cell.

Example 5

Hiding a planar texture image was demonstrated using a display cell as described in Example 3. The display cell was masked with an image and the cell exposed through the mask to UV light (637 $\mu W/cm^2$ at $\lambda_{max}$=365 nm) for 10s whereby a planar image in the planar texture appeared on the cell. This image could then be hidden by switching the entire display cell to the focal conic texture. This was done by applying a voltage multiple times while decreasing the voltage from 20 volts to 10 volts, until the entire display was in the focal-conic texture. The applied voltage was applied for 100 ms at a time at a frequency of 250 Hz. Once in the focal-conic texture, the image was not observable. The planar image could be made to reappear by applying a 100 ms pulse at 35 V at a frequency of 250 Hz to switch the entire cell to the planar texture.

Example 6

A photo image was created in the planar texture of a cholesteric liquid crystal coating deposited on the single plastic substrate. A layer of encapsulated cholesteric liquid crystal in polymer binder was coated from water-based emulsion on the thin plastic substrate using a doctor blade having a 37 micron gap and allowed to dry for 30 min at room temperature. The thickness of encapsulated liquid crystal layer was approximately 25 μm. The ratio between liquid crystal and binder was 6:1. The emulsion was prepared from 0.4 g of liquid crystal mixture consisting of 6.0% chiral molecule 3b and 94% nematic host, (a commercial high birefringence, high dielectric anisotropy nematic mixture by Merck) and 0.27 g of NeoRez R967. To improve the display contrast, a small amount (0.4 wt %) of 4-hexylamino-4'-nitro-azobenzene dye was added to liquid crystal before emulsification. The mixture was emulsified with a homogenizer at 1000 rpm for 3-4 min at room temperature and coated by doctor blade with a gap of 25 µm. The average size of cholesteric liquid crystal droplets was about 18 µm in diameter. The UV exposure of the encapsulated cholesteric coating through the mask for 10 minutes (637 µW/cm$^2$ at $\lambda_{max}$=365 nm) results in a planar image written on the photodisplay. Encapsulation of the liquid crystal impedes molecular self diffusion from degrading the image.

Many modifications and variations of the invention will be apparent to those of ordinary skill in the art in light of the foregoing disclosure. Therefore, it is to be understood that, within the scope of the appended claims, the invention can be practiced otherwise than has been specifically shown and described.

What is claimed is:

1. A chiral nematic liquid crystal photodisplay comprising:
 a liquid crystal layer including bistable cholesteric liquid crystal material, said liquid crystal material comprising nematic liquid crystal and at least one photosensitive chiral additive, wherein said photosensitive chiral additive changes a reflective wavelength of said liquid crystal layer at exposed regions at which addressing electromagnetic radiation is incident on said liquid crystal layer, regions of said liquid crystal layer that are not exposed to said addressing radiation being unexposed regions, thereby producing a planar image comprising said exposed regions and said unexposed regions both in planar textures of different reflective wavelengths;
 electrically conductive layers flanking said liquid crystal layer; and
 electrical addressing means for applying an electric field to said liquid crystal layer between said conductive layers, wherein said electrical addressing means applies the electric field at a magnitude that switches said liquid crystal material of either one of said exposed regions or said unexposed regions, but not the other, to a focal conic texture producing a fixed image that resists degradation with time.

2. The photodisplay of claim 1 wherein said electrical addressing means applies the electric field at a magnitude that switches said unexposed regions to the focal conic texture producing a positive said fixed image.

3. The photodisplay of claim 2 wherein said electrical addressing means applies a voltage pulse to said conductive layers of a magnitude that switches said unexposed regions to the focal conic texture producing said fixed positive image.

4. The photodisplay of claim 1 wherein said planar image is erased from the planar texture by thermal relaxation of the exposed photosensitive chiral additive.

5. The photodisplay of claim 1 wherein said electrical addressing means applies a voltage pulse to said conductive layers that returns said fixed image to said planar image.

6. The photodisplay of claim 5 wherein said voltage pulse is of sufficient magnitude to drive all of the chiral nematic material of said display to a homeotropic state during application of the pulse and into the planar texture following the pulse.

7. The photodisplay of claim 1 wherein the planar image is erased from the planar texture by exposure of visible light to the photosensitive chiral additive.

8. The photodisplay of claim 1 wherein said addressing radiation is ultraviolet light.

9. The photodisplay of claim 1 wherein said electric field is applied in the form of a voltage pulse of a magnitude that places all of said liquid crystal material of said display in the focal conic texture resulting in said planar image not being displayed, and said electric field is applied in the form of a voltage pulse of a magnitude that places all of said liquid crystal material of said display in the planar texture resulting in said planar image being displayed.

10. The photodisplay of claim 1 comprising a substrate, one of said conductive layers being disposed between said substrate and said liquid crystal layer.

11. The photodisplay of claim 10 wherein said substrate is flexible and selected from the group consisting of a polymer, fabric, electrotextile, a metal foil, a flexible printed circuit board, a flexible graphite foil sheet, a flexible composite or nanocomposite film, a flexible opto-electronic device, a flexible glass sheet, a nanofiber fabric and combinations thereof.

12. The photodisplay of claim 11 comprising a second substrate that is flexible, another of said conductive layers being disposed between said second substrate and said liquid crystal layer.

13. The photodisplay of claim 1 wherein said photosensitive chiral additive comprises the following structure:

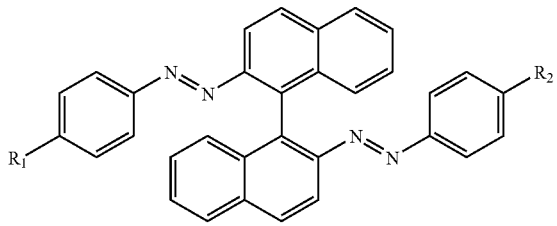

wherein $R_1$ and $R_2$ may independently be a straight chain or branched chain alkyl group which each contains at least one substituent selected from the group consisting of: any chiral center, halogen, $NO_2$, CN, O, S, C=C, C≡C, an aromatic group, a polyaromatic group, a heterocyclic group, a cycloalkyl group, and combinations thereof.

14. The photodisplay of claim 1 wherein said photosensitive chiral additive comprises the following structure:

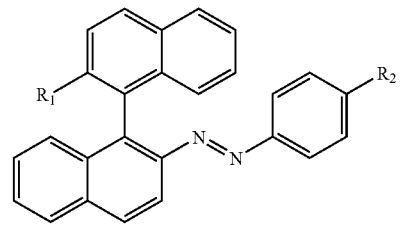

wherein $R_1$ and $R_2$ may independently be a straight chain or branched chain alkyl group which each contains at least one substituent selected from the group consisting of: any chiral center, halogen, $NO_2$, CN, O, S, C=C, C≡C, an aromatic group, a polyaromatic group, a heterocyclic group, a cycloalkyl group, and combinations thereof.

15. A device comprising the photodisplay of claim 1 wherein said device is selected from the group consisting of: point of sales signs, debit cards, credit cards, name plates, name tags, informational signs, and electronic shelf labels.

16. The photodisplay of claim 1 wherein said liquid crystal layer comprises a dispersion of the liquid crystal material in a polymer matrix.

17. The photodisplay of claim 1 wherein said conductive layers are unpatterned.

18. The photodisplay of claim 1 comprising a first light filter disposed near a viewing side of said display upstream of said liquid crystal layer relative to a direction of incident light used to view the display, said first light filter being able to absorb incident visible and ultraviolet light, said first light filter being movable between a closed position that covers said liquid crystal layer and an open position in which said liquid crystal layer is uncovered and in which regions of said liquid crystal layer are exposed to said addressing electromagnetic radiation; and
 a second light filter disposed on a side opposite the viewing side of the display downstream of said liquid crystal layer that absorbs visible light that passes through said liquid crystal layer.

19. The photodisplay of claim 18 wherein said addressing radiation travels in the direction of incident light to the viewing side of the display and said first light filter possesses an absorption spectrum sufficient to prevent degradation of said planar image by the incident light.

20. The photodisplay of claim 18 wherein said second light filter absorbs all visible light that passes said first filter and said liquid crystal layer such that said second filter appears black.

21. The photodisplay of claim 18 wherein said addressing radiation travels opposite to the direction of incident light to the side opposite the viewing side of the display and said second filter permits transmission of said addressing radiation to said liquid crystal layer.

22. The photodisplay of claim 18 wherein said second filter absorbs light of a particular color.

23. A chiral nematic liquid crystal photodisplay apparatus comprising:
 said photodisplay of claim 18; and
 optical addressing means for addressing said exposed regions of said liquid crystal layer with said addressing electromagnetic radiation of a particular wavelength.

24. The photodisplay apparatus of claim 23 wherein said optical addressing means is a device including a component selected from the group consisting of: a light emitting diode, an organic light emitting diode, a fluorescent display and a backlit liquid crystal display.

25. The photodisplay apparatus of claim 23 comprising a mask including an image, said mask being interposed between said optical addressing means and said photodisplay for producing said planar image on said display.

26. The photodisplay of claim 1 wherein said electrical addressing means applies the electric field at a magnitude that switches the exposed regions to the focal conic texture producing a negative said fixed image.

27. The photodisplay of claim 26 wherein said electrical addressing means applies a voltage pulse to said conductive layers of a magnitude that switches said exposed regions to the focal conic texture producing said fixed negative image.

28. The photodisplay of claim 1 wherein said cholesteric liquid crystal material comprises at least one chiral compound that is not photosensitive.

29. The photodisplay of claim 1 wherein a percent said change of reflective wavelength of said liquid crystal layer= $(100) \Delta\lambda/\lambda = \xi_c(\Delta\beta_c)100/(\beta_n\xi_n+\beta_c\xi_c)$, where $\Delta X$ is a change in reflective wavelength of said planar texture comparing said reflective wavelength of said planar texture after exposure to said addressing radiation to $\lambda$ which is a reflective wavelength of said planar texture before exposure to said addressing radiation, $\xi_c$ is a concentration of said photosensitive chiral additive, $\Delta\beta_c$, is a change of twisting power of said photosensitive chiral additive comparing said twisting power of said photosensitive chiral additive after said exposure to said addressing radiation ($\beta_c$) to said twisting power of said photosensitive chiral additive before said exposure to said addressing radiation, $\beta_n$ is said twisting power of a non-photosensitive chiral additive if any, and $\xi_n$ is a concentration of said non-photosensitive chiral additive if any.

30. The photodisplay of claim 1 comprising at least one transparent upper substrate, one of said conductive layers being disposed between said substrate and said liquid crystal layer.

31. A chiral nematic liquid crystal photodisplay comprising:
 a liquid crystal layer including bistable cholesteric liquid crystal material, said liquid crystal material comprising nematic liquid crystal and at least one photosensitive chiral additive;
 wherein said liquid crystal layer comprises exposed regions of said liquid crystal layer that have been exposed to electromagnetic radiation including said photosensitive chiral additive of a twisting power, and unexposed regions of said liquid crystal layer that have not been exposed to said electromagnetic radiation, said unexposed regions including said photosensitive chiral additive of a different twisting power than in said exposed regions;
 electrically conductive layers disposed on both sides of said liquid crystal layer;
 drive electronics that apply a voltage pulse to said conductive layers at a magnitude such that said liquid crystal material of one of said exposed regions and said unexposed regions, is in a planar texture while said liquid crystal material of the other one of said exposed regions and said unexposed regions is in a focal conic texture producing a fixed image that resists degradation with time.

32. The photodisplay of claim 31 comprising at least one transparent upper substrate, one of said conductive layers being disposed between said substrate and said liquid crystal layer.

33. The photodisplay of claim 31 comprising a light absorbing layer that absorbs light passing through said liquid crystal layer.

34. The photodisplay of claim 31 wherein said liquid crystal material comprises at least one chiral compound that is not photosensitive.

35. The photodisplay of claim 31 wherein said liquid crystal layer comprises a dispersion of said liquid crystal material in a polymer matrix.

36. The photodisplay of claim 31 comprising at least one substrate, one of said conductive layers being disposed between said substrate and said liquid crystal layer, wherein said substrate is flexible and selected from the group consisting of a polymer, fabric, electrotextile, a metal foil, a flexible printed circuit board, a flexible graphite foil sheet, a flexible composite or nanocomposite film, a flexible opto-electronic device, a flexible glass sheet, a nanofiber fabric and combinations thereof.

37. The photodisplay of claim 36 comprising a second substrate that is flexible, another of said conductive layers being disposed between said second substrate and said liquid crystal layer.

38. The photodisplay of claim 31 comprising a planar image wherein said exposed regions and said unexposed regions are both in said planar texture and said exposed regions have a different reflective wavelength than said unexposed regions due to said different twisting power of said photosensitive chiral additive in said unexposed regions compared to said twisting power of said photosensitive chiral additive in said exposed regions.

39. The photodisplay of claim 31 wherein said photosensitive chiral additive is in different isomer forms when having said twisting power and said different twisting power, due to said exposure to said electromagnetic radiation.

40. The photodisplay of claim 39 wherein said photosensitive chiral additive is returned to a stable said isomer form upon application of visible light or heat.

41. A device comprising the photodisplay of claim 31 wherein said device is selected from the group consisting of: point of sales signs, debit cards, credit cards, name plates, name tags, informational signs, and electronic shelf labels.

42. The photodisplay of claim 31 wherein said drive electronics erase said fixed image by applying a voltage pulse to said conductive layers that places both said exposed regions and said unexposed regions into the same texture.

\* \* \* \* \*